(12) United States Patent
Moll et al.

(10) Patent No.: US 12,373,096 B2
(45) Date of Patent: Jul. 29, 2025

(54) AR-BASED VIRTUAL KEYBOARD

(71) Applicant: Snap Inc., Santa Monica, CA (US)

(72) Inventors: Sharon Moll, Lachen (CH); Dawei Zhang, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/804,818

(22) Filed: May 31, 2022

(65) Prior Publication Data

US 2023/0384928 A1    Nov. 30, 2023

(51) Int. Cl.
G06F 3/04886    (2022.01)
G06F 3/01    (2006.01)
G06F 3/04842    (2022.01)

(52) U.S. Cl.
CPC .......... *G06F 3/04886* (2013.01); *G06F 3/011* (2013.01); *G06F 3/04842* (2013.01)

(58) Field of Classification Search
CPC ... G06F 3/04886; G06F 3/011; G06F 3/04842
See application file for complete search history.

(56) References Cited

U.S. PATENT DOCUMENTS

| | | | |
|---|---|---|---|
| 5,828,197 A | 10/1998 | Martin et al. | |
| 7,971,156 B2 | 6/2011 | Albertson et al. | |
| 7,996,793 B2 | 8/2011 | Latta et al. | |
| 8,487,938 B2 | 7/2013 | Latta et al. | |
| 8,854,433 B1 * | 10/2014 | Rafii | G06F 3/011 |
| | | | 348/42 |
| 8,856,691 B2 | 10/2014 | Geisner et al. | |
| 9,225,897 B1 | 12/2015 | Sehn et al. | |
| 9,230,160 B1 | 1/2016 | Kanter | |
| 9,276,886 B1 | 3/2016 | Samaranayake | |
| 9,377,863 B2 | 6/2016 | Bychkov et al. | |
| 9,705,831 B2 | 7/2017 | Spiegel | |
| 9,742,713 B2 | 8/2017 | Spiegel et al. | |
| 9,910,498 B2 * | 3/2018 | Kutliroff | G06F 3/011 |

(Continued)

FOREIGN PATENT DOCUMENTS

CN    103049761    8/2016
CN    119137576 A    12/2024

(Continued)

OTHER PUBLICATIONS

U.S. Appl. No. 17/729,808, filed Apr. 26, 2022, Gesture-Based Keyboard Text Entry.

(Continued)

*Primary Examiner* — Jeremy L Stanley
(74) *Attorney, Agent, or Firm* — Schwegman Lundberg & Woessner, P.A.

(57) ABSTRACT

A gesture-based text entry user interface for an Augmented Reality (AR) device is provided. The AR system detects a start text entry gesture made by a user of the AR system, generates a virtual keyboard user interface including a virtual keyboard having a plurality of virtual keys, and provides to the user the virtual keyboard user interface. The AR system determines using the one or more cameras, the user's selection of one or more selected virtual keys of the plurality of virtual keys and generates entered text data based on the one or more selected virtual keys. The AR system provides the entered text data to the user using a display of the AR system.

14 Claims, 15 Drawing Sheets

(56) References Cited

U.S. PATENT DOCUMENTS

| | | |
|---|---|---|
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,540,001 B1* | 1/2020 | Poupyrev .............. H04W 16/28 |
| 10,579,869 B1 | 3/2020 | Xiong et al. |
| 10,591,730 B2 | 3/2020 | Rodriguez, II et al. |
| 10,614,855 B2 | 4/2020 | Huang |
| 10,642,458 B2 | 5/2020 | Tan et al. |
| 10,748,347 B1 | 8/2020 | Li et al. |
| 10,817,126 B2 | 10/2020 | Kim |
| 10,956,724 B1* | 3/2021 | Terrano ................ G06N 20/00 |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,145,135 B1* | 10/2021 | Ng ...................... G06F 3/04817 |
| 11,169,600 B1 | 11/2021 | Canberk et al. |
| 11,188,154 B2* | 11/2021 | Rakshit ................ H04W 4/38 |
| 11,227,626 B1 | 1/2022 | Krishnan Gorumkonda et al. |
| 11,232,643 B1 | 1/2022 | Stevens et al. |
| 11,307,747 B2 | 4/2022 | Dancie et al. |
| 11,366,512 B2 | 6/2022 | Harvey et al. |
| 11,379,099 B2 | 7/2022 | Cheng |
| 11,422,669 B1 | 8/2022 | Ravasz et al. |
| 11,449,189 B1* | 9/2022 | Bond .................. G06F 3/04815 |
| 11,500,514 B2 | 11/2022 | Hildreth |
| 11,531,402 B1 | 12/2022 | Stolzenberg |
| 11,546,505 B2 | 1/2023 | Canberk |
| 11,567,578 B2 | 1/2023 | Yang et al. |
| 11,914,789 B2 | 2/2024 | Chen et al. |
| 2009/0012788 A1 | 1/2009 | Gilbert et al. |
| 2009/0228842 A1 | 9/2009 | Westerman et al. |
| 2009/0259865 A1 | 10/2009 | Sheynblat et al. |
| 2010/0328209 A1 | 12/2010 | Nakao |
| 2011/0122130 A1 | 5/2011 | Vesely et al. |
| 2011/0301934 A1 | 12/2011 | Tardif |
| 2012/0124516 A1 | 5/2012 | Friedman |
| 2012/0212406 A1 | 8/2012 | Osterhout et al. |
| 2012/0218172 A1 | 8/2012 | Border et al. |
| 2012/0306772 A1 | 12/2012 | Tan et al. |
| 2012/0309532 A1* | 12/2012 | Ambrus ................ A63F 13/213 463/36 |
| 2013/0021288 A1 | 1/2013 | Kaerkkaeinen et al. |
| 2013/0278631 A1* | 10/2013 | Border ................ G06Q 30/02 345/633 |
| 2013/0328770 A1* | 12/2013 | Parham ................ H04N 9/31 345/157 |
| 2014/0007022 A1* | 1/2014 | Tocino Diaz .......... G06V 40/28 715/863 |
| 2014/0104320 A1 | 4/2014 | Davidson et al. |
| 2014/0125584 A1 | 5/2014 | Xun et al. |
| 2014/0163983 A1 | 6/2014 | Kim |
| 2014/0171036 A1 | 6/2014 | Simmons |
| 2014/0184496 A1* | 7/2014 | Gribetz ................ G06F 3/04842 345/156 |
| 2014/0201666 A1 | 7/2014 | Bedikian et al. |
| 2014/0347329 A1 | 11/2014 | Ware |
| 2015/0031299 A1* | 1/2015 | Holman ................ H04B 7/24 455/41.2 |
| 2015/0082246 A1 | 3/2015 | Tan et al. |
| 2015/0120293 A1 | 4/2015 | Wohlert et al. |
| 2015/0130688 A1 | 5/2015 | Li et al. |
| 2015/0186708 A1* | 7/2015 | Katz .................... G06V 20/653 382/115 |
| 2015/0309316 A1* | 10/2015 | Osterhout ............ G06F 3/03547 345/8 |
| 2015/0332031 A1* | 11/2015 | Mistry .................. H04W 12/06 726/19 |
| 2015/0370320 A1 | 12/2015 | Connor |
| 2016/0018985 A1* | 1/2016 | Bennet .................. G09G 3/002 345/175 |
| 2016/0026253 A1* | 1/2016 | Bradski ................ H04N 13/128 345/8 |
| 2016/0077793 A1* | 3/2016 | Disano ................ G06F 3/04883 715/728 |
| 2016/0109953 A1* | 4/2016 | Desh ...................... G06F 3/011 345/169 |
| 2016/0187654 A1* | 6/2016 | Border ................ G02B 27/0172 359/630 |
| 2016/0209928 A1* | 7/2016 | Kandur Raja ...... G06F 3/04886 |
| 2016/0232713 A1 | 8/2016 | Lee |
| 2016/0283105 A1 | 9/2016 | Maloo et al. |
| 2016/0364091 A1 | 12/2016 | Bernstein et al. |
| 2016/0364138 A1* | 12/2016 | Luo ...................... G06F 1/1626 |
| 2016/0370882 A1 | 12/2016 | Mcgrath et al. |
| 2017/0017393 A1* | 1/2017 | Luo .................... G06F 3/04812 |
| 2017/0068849 A1* | 3/2017 | Lim ...................... G06T 7/593 |
| 2017/0115742 A1 | 4/2017 | Xing et al. |
| 2017/0123487 A1* | 5/2017 | Hazra ................ G06F 3/04845 |
| 2017/0277684 A1 | 9/2017 | Dharmarajan Mary |
| 2017/0277685 A1 | 9/2017 | Takumi |
| 2017/0308259 A1* | 10/2017 | Regnier ................ B60K 37/06 |
| 2017/0322623 A1* | 11/2017 | McKenzie .......... G06F 3/04886 |
| 2017/0329515 A1 | 11/2017 | Clement et al. |
| 2017/0351910 A1 | 12/2017 | Elwazer et al. |
| 2018/0032146 A1 | 2/2018 | Yun |
| 2018/0088786 A1 | 3/2018 | Abzarian et al. |
| 2018/0158370 A1 | 6/2018 | Pryor |
| 2018/0181199 A1* | 6/2018 | Harvey ................ G06F 3/014 |
| 2018/0181245 A1 | 6/2018 | Beck et al. |
| 2018/0211405 A1 | 7/2018 | Zhang et al. |
| 2018/0267757 A1 | 9/2018 | Segal |
| 2018/0276897 A1 | 9/2018 | Zhang et al. |
| 2018/0307303 A1* | 10/2018 | Powderly .............. G06F 3/017 |
| 2019/0094981 A1* | 3/2019 | Bradski ................ G06F 3/017 |
| 2019/0121522 A1* | 4/2019 | Davis .................. G02B 27/017 |
| 2019/0146219 A1 | 5/2019 | Rodriguez, II |
| 2019/0155482 A1 | 5/2019 | Chai et al. |
| 2019/0258320 A1 | 8/2019 | Yang et al. |
| 2019/0362557 A1* | 11/2019 | Lacey ...................... G06T 5/20 |
| 2020/0012946 A1* | 1/2020 | Costa ...................... G06F 3/044 |
| 2020/0097082 A1* | 3/2020 | Berenzweig ............ G06F 3/017 |
| 2020/0117282 A1* | 4/2020 | Lee ........................ G06T 7/90 |
| 2020/0153450 A1* | 5/2020 | Lowe .................... H04W 4/70 |
| 2020/0249778 A1 | 8/2020 | Kim et al. |
| 2020/0302699 A1 | 9/2020 | Cantor et al. |
| 2020/0326966 A1 | 10/2020 | Tsirkin |
| 2020/0341580 A1 | 10/2020 | Rosenbaum et al. |
| 2020/0387214 A1 | 12/2020 | Ravasz et al. |
| 2020/0387229 A1 | 12/2020 | Ravasz et al. |
| 2020/0387287 A1 | 12/2020 | Ravasz et al. |
| 2020/0410755 A1 | 12/2020 | Nakata |
| 2021/0011612 A1 | 1/2021 | Dancie et al. |
| 2021/0042010 A1 | 2/2021 | Kim |
| 2021/0065455 A1* | 3/2021 | Beith .................. G02B 27/0172 |
| 2021/0074016 A1 | 3/2021 | Li et al. |
| 2021/0089801 A1 | 3/2021 | Durandet et al. |
| 2021/0110646 A1* | 4/2021 | Dixit .................... G02B 27/017 |
| 2021/0124417 A1* | 4/2021 | Ma ........................ G06F 3/0484 |
| 2021/0166732 A1 | 6/2021 | Shaburova et al. |
| 2021/0173207 A1 | 6/2021 | Bamberger et al. |
| 2021/0173480 A1* | 6/2021 | Osterhout ............ G06F 3/0227 |
| 2021/0174034 A1 | 6/2021 | Retek et al. |
| 2021/0241529 A1 | 8/2021 | Cowburn et al. |
| 2021/0247896 A1 | 8/2021 | Tanemura et al. |
| 2021/0248407 A1 | 8/2021 | Hirai |
| 2021/0271342 A1 | 9/2021 | Tomizawa et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |

(56) References Cited

U.S. PATENT DOCUMENTS

| | | | |
|---|---|---|---|
| 2021/0319617 | A1* | 10/2021 | Ahn ..................... G06T 15/205 |
| 2021/0358330 | A1 | 11/2021 | Johnson et al. |
| 2021/0382564 | A1 | 12/2021 | Blachly et al. |
| 2021/0397000 | A1 | 12/2021 | Rodriguez, II |
| 2021/0405761 | A1 | 12/2021 | Canberk |
| 2021/0407203 | A1 | 12/2021 | Canberk et al. |
| 2022/0059159 | A1 | 2/2022 | Holland et al. |
| 2022/0100267 | A1 | 3/2022 | Robinson et al. |
| 2022/0122335 | A1 | 4/2022 | Robinson et al. |
| 2022/0179497 | A1* | 6/2022 | Jung ..................... G06T 11/00 |
| 2022/0188539 | A1 | 6/2022 | Chan et al. |
| 2022/0206588 | A1 | 6/2022 | Canberk et al. |
| 2022/0236795 | A1* | 7/2022 | Jonker ................. G06F 3/011 |
| 2022/0253146 | A1* | 8/2022 | Erivantcev ........... G06F 3/011 |
| 2022/0262074 | A1 | 8/2022 | Chen |
| 2022/0276729 | A1 | 9/2022 | Gutierrez et al. |
| 2022/0291753 | A1* | 9/2022 | Erivantcev ........... G06F 3/017 |
| 2022/0300730 | A1 | 9/2022 | Eirinberg et al. |
| 2022/0300731 | A1 | 9/2022 | Eirinberg et al. |
| 2022/0301231 | A1 | 9/2022 | Eirinberg et al. |
| 2022/0308669 | A1 | 9/2022 | Beck et al. |
| 2022/0326781 | A1 | 10/2022 | Hwang et al. |
| 2022/0334649 | A1 | 10/2022 | Hwang et al. |
| 2022/0335673 | A1* | 10/2022 | Jang ................... H04N 1/00392 |
| 2022/0375174 | A1 | 11/2022 | Arya et al. |
| 2023/0072423 | A1 | 3/2023 | Osborn et al. |
| 2023/0096728 | A1 | 3/2023 | Hébert |
| 2023/0229240 | A1* | 7/2023 | Chen ................. G06F 3/04815 715/773 |
| 2023/0259697 | A1 | 8/2023 | Fan |
| 2023/0342026 | A1 | 10/2023 | Moll et al. |
| 2023/0377223 | A1 | 11/2023 | Moll et al. |
| 2025/0068326 | A1 | 2/2025 | Moll et al. |

FOREIGN PATENT DOCUMENTS

| | | |
|---|---|---|
| CN | 119213468 A | 12/2024 |
| CN | 119301544 A | 1/2025 |
| EP | 3707693 | 9/2020 |
| EP | 4172726 A1 | 5/2023 |
| EP | 4172730 A1 | 5/2023 |
| KR | 20200038845 | 4/2020 |
| KR | 20210082950 | 7/2021 |
| KR | 20220158824 A | 12/2022 |
| WO | 2016168591 | 10/2016 |
| WO | 2019094618 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022060549 A3 | 4/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |
| WO | 2023211702 | 11/2023 |
| WO | 2023224982 | 11/2023 |
| WO | 2023235672 | 12/2023 |

OTHER PUBLICATIONS

U.S. Appl. No. 17/664,010, filed May 18, 2022, Hand-Tracked Text Selection and Modification "U.S. Appl. No. 17/664,010, Non Final Office Action mailed Apr. 21, 2023", 16 pgs.

"U.S. Appl. No. 17/664,010, Response filed Jul. 21, 2023 to Non Final Office Action mailed Apr. 21, 2023", 12 pgs.

"International Application Serial No. PCT/US2023/018642, International Search Report mailed Jul. 26, 2023", 3 pgs.

"International Application Serial No. PCT/US2023/018642, Written Opinion mailed Jul. 26, 2023", 4 pgs.

"International Application Serial No. PCT/US2023/022367, International Search Report mailed Sep. 8, 2023", 3 pgs.

"International Application Serial No. PCT/US2023/022367, Written Opinion mailed Sep. 8, 2023", 3 pgs.

"International Application Serial No. PCT/US2023/067456, International Search Report mailed Sep. 11, 2023", 4 pgs.

"International Application Serial No. PCT/US2023/067456, Written Opinion mailed Sep. 11, 2023", 4 pgs.

"U.S. Appl. No. 17/664,010, Notice of Allowance mailed Oct. 30, 2023", 13 pgs.

"U.S. Appl. No. 17/664,010, Corrected Notice of Allowability mailed Nov. 8, 2023", 2 pgs.

"U.S. Appl. No. 17/729,808, Non Final Office Action mailed Dec. 7, 2023", 10 pgs.

"U.S. Appl. No. 17/664,010, Non Final Office Action mailed Feb. 12, 2024", 12 pgs.

"U.S. Appl. No. 17/729,808, Final Office Action mailed Mar. 25, 2024", 12 pgs.

"U.S. Appl. No. 17/729,808, Response filed Mar. 7, 2024 to Non Final Office Action mailed Dec. 7, 2023", 10 pgs.

Darbar, et al., "Exploring Smartphone-enabled Text Selection in AR-HMD", Graphics Interface, (May 2021), 1-11.

Ro, et al., "Advanced Ray-Casting Interface Using Laser Pointer Metaphor for Object Manipulation in 3D Augmented Reality Environment", Applied Science, (Jul. 2019), 1-18.

"U.S. Appl. No. 17/664,010, Response filed May 13, 2024 to Non Final Office Action mailed Feb. 12, 2024", 11 pgs.

"U.S. Appl. No. 17/729,808, Response filed Jun. 25, 2024 to Final Office Action mailed Mar. 25, 2024", 9 pgs.

"U.S. Appl. No. 17/664,010, Final Office Action mailed Jul. 29, 2024", 14 pgs.

"U.S. Appl. No. 17/729,808, Notice of Allowance mailed Aug. 14, 2024", 8 pgs.

"U.S. Appl. No. 17/664,010, Advisory Action mailed Oct. 24, 2024", 3 pgs.

"U.S. Appl. No. 17/664,010, Examiner Interview Summary mailed Sep. 20, 2024", 2 pgs.

"U.S. Appl. No. 17/664,010, Response filed Sep. 30, 2024 to Final Office Action mailed Jul. 29, 2024", 11 pgs.

"U.S. Appl. No. 17/729,808, Corrected Notice of Allowability mailed Aug. 29, 2024", 3 pgs.

"International Application Serial No. PCT/US2023/018642, International Preliminary Report on Patentability mailed Nov. 7, 2024", 6 pgs.

"U.S. Appl. No. 17/664,010, Notice of Allowance mailed Feb. 5, 2025", 9 pgs.

"U.S. Appl. No. 17/664,010, Notice of Allowance mailed Nov. 14, 2024", 10 pgs.

"U.S. Appl. No. 17/729,808, Notice of Allowance mailed Nov. 20, 2024", 9 pgs.

"International Application Serial No. PCT/US2023/022367, International Preliminary Report on Patentability mailed Nov. 28, 2024", 5 pgs.

"International Application Serial No. PCT/US2023/067456, International Preliminary Report on Patentability mailed Dec. 12, 2024", 6 pgs.

* cited by examiner

AR-BASED VIRTUAL KEYBOARD

TECHNICAL FIELD

The present disclosure generally relates to user interfaces and, more particularly, to user interfaces used in augmented and virtual reality.

BACKGROUND

A head-worn device may be implemented with a transparent or semi-transparent display through which a user of the head-worn device can view the surrounding environment. Such devices enable a user to see through the transparent or semi-transparent display to view the surrounding environment, and to also see objects (e.g., virtual objects such as a rendering of a 2D or 3D graphic model, images, video, text, and so forth) that are generated for display to appear as a part of, and/or overlaid upon, the surrounding environment. This is typically referred to as "augmented reality" or "AR." A head-worn device may additionally completely occlude a user's visual field and display a virtual environment through which a user may move or be moved. This is typically referred to as "virtual reality" or "VR." As used herein, the term AR refers to either or both augmented reality and virtual reality as traditionally understood, unless the context indicates otherwise.

A user of the head-worn device may access and use computer software applications to perform various tasks or engage in an entertaining activity. Performing the tasks or engaging in the entertaining activity may include entry of text. To enter the text, the user interacts with a text entry user interface provided by the head-worn device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
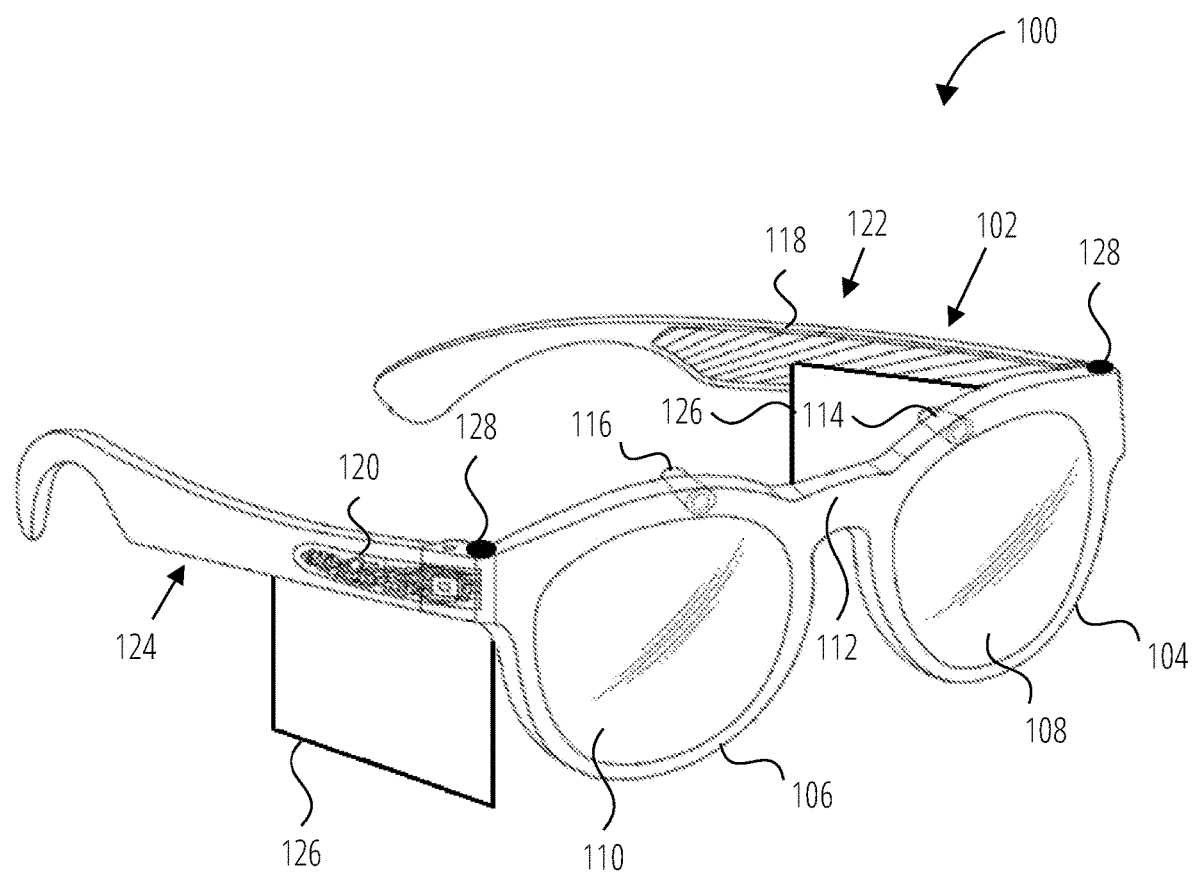
FIG. 1 is a perspective view of a head-worn device, in accordance with some examples.

AR systems, such as user-worn AR devices, are limited when it comes to available user input modalities. As compared other mobile devices, such as mobile phones, it is more complicated for a user of an AR system to indicate user intent and invoke an action or application. When using a mobile phone, a user may go to a home screen and tap on a specific icon to start an application. However, because of a lack of a physical input device such as a touchscreen or keyboard, such interactions are not as easily performed on an AR system. Typically, users can indicate their intent by pressing a limited number of hardware buttons or using a small touchpad. Therefore, it would be desirable to have an input modality that allowed for a greater range of inputs that could be utilized by a user to indicate their intent through a user input.

An input modality that may be utilized with AR systems, according to some examples, is hand-tracking combined with Direct Manipulation of Virtual Objects (DMVO), where a user is provided with a user interface that is displayed to the user in an AR overlay having a 2D or 3D rendering. The rendering is of a graphic model in 2D or 3D where virtual objects located in the model correspond to interactive elements of the user interface. In this way, the user perceives the virtual objects as objects within an overlay in the user's field of view of the real-world scene while wearing the AR system, or perceives the virtual objects as objects within a virtual world as viewed by the user while wearing the AR system. To allow the user to manipulate the virtual objects, the AR system detects the user's hands and tracks their movement, location, and/or position to determine the user's interactions with the virtual objects.

In additional examples, gestures that do not involve DMVO provide another input modality suitable for use with AR systems, such as user-worn AR systems. Gestures are made by a user moving and positioning portions of the user's body while those portions of the user's body are detectable by an AR system while the user is wearing the AR system. The detectable portions of the user's body may include portions of the user's upper body, arms, hands, and fingers. Components of a gesture may include the movement of the user's arms and hands, location of the user's arms and hands in space, and positions in which the user holds their upper body, arms, hands, and fingers. Gestures are useful in providing an AR experience for a user as they offer a way of providing user inputs into the AR system during an AR experience without having the user take their focus off of the AR experience. As an example, in an AR experience that is an operational manual for a piece of machinery, the user may simultaneously view the piece of machinery in the real-world scene through the lenses of the AR system, view an AR overlay on the real-world scene view of the machinery, and provide user inputs into the AR system.

By combining both hand-tracked DMVO and gesture input modalities, an improved text entry user interface is provided to a user of an AR system. In some examples, a user makes a gesture to open a virtual keyboard. The virtual keyboard includes virtual keys that the user manipulates using a text entry hand, such as their left hand. The AR system determines the user's selection of one or more selected virtual keys of the plurality of virtual keys using DMVO methodologies and generates entered text data based on the one or more selected virtual keys. The AR system provides the entered text data to the user using a display of the AR system.

In additional examples, the user is provided with an infinite ray cursor that the user steers using their text entry hand. The user steers the infinite ray cursor to select one or more virtual keys of the virtual keyboard by intersecting the infinite ray cursor with the one or more virtual keys.

Other technical features may be readily apparent to one skilled in the art from the following figures, descriptions, and claims.

FIG. 1 is a perspective view of an AR system composed of a head-worn device (e.g., glasses 100 of FIG. 1), in accordance with some examples. The glasses 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the glasses 100.

The frame 102 additionally includes a left arm or temple piece 122 and a right arm or temple piece 124. In some examples, the frame 102 can be formed from a single piece of material so as to have a unitary or integral construction.

The glasses 100 can include a computing device, such as a computer 120, which can be of any suitable type so as to be carried by the frame 102 and, in one or more examples, of a suitable size and shape, so as to be partially disposed in one of the temple piece 122 or the temple piece 124. The computer 120 can include one or more processors with memory, wireless communication circuitry, and a power source. As discussed below, the computer 120 comprises low-power circuitry, high-speed circuitry, and a display processor. Various other examples may include these elements in different configurations or integrated together in different ways. Additional details of aspects of computer 120 may be implemented as illustrated by the data processor 802 discussed below.

The computer 120 additionally includes a battery 118 or other suitable portable power supply. In some examples, the battery 118 is disposed in left temple piece 122 and is electrically coupled to the computer 120 disposed in the right temple piece 124. The glasses 100 can include a connector or port (not shown) suitable for charging the battery 118, a wireless receiver, transmitter or transceiver (not shown), or a combination of such devices.

The glasses 100 include a first or left camera 114 and a second or right camera 116. Although two cameras are depicted, other examples contemplate the use of a single or additional (i.e., more than two) cameras. In one or more examples, the glasses 100 include any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide video frame data for use by the glasses 100 to extract 3D information from a real-world scene.

The glasses 100 may also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input may be provided by one or more buttons 128, which in the illustrated examples are provided on the outer upper edges of the left optical element holder 104 and right optical element holder 106. The one or more touchpads 126 and buttons 128 provide a means whereby the glasses 100 can receive input from a user of the glasses 100.

Figure 2:
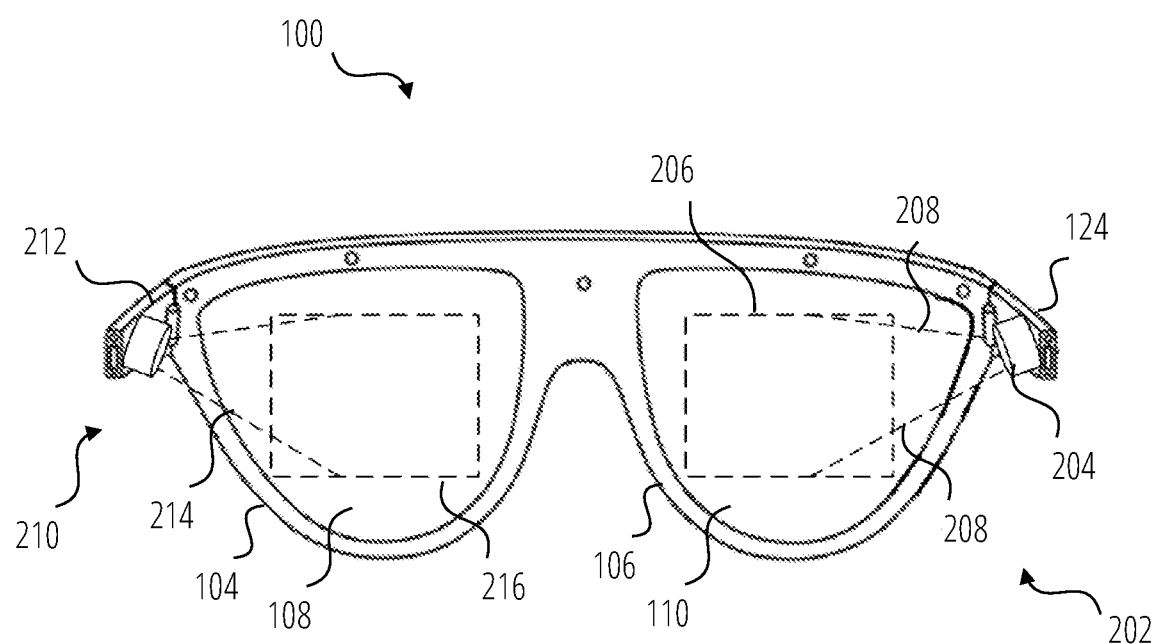
FIG. 2 illustrates a further view of the head-worn device of FIG. 1, in accordance with some examples.

FIG. 2 illustrates the glasses 100 from the perspective of a user. For clarity, a number of the elements shown in FIG. 1 have been omitted. As described in FIG. 1, the glasses 100 shown in FIG. 2 include left optical element 108 and right optical element 110 secured within the left optical element holder 104 and the right optical element holder 106 respectively.

The glasses 100 include forward optical assembly 202 comprising a right projector 204 and a right near eye display 206, and a forward optical assembly 210 including a left projector 212 and a left near eye display 216.

In some examples, the near eye displays are waveguides. The waveguides include reflective or diffractive structures (e.g., gratings and/or optical elements such as mirrors, lenses, or prisms). Light 208 emitted by the projector 204 encounters the diffractive structures of the waveguide of the near eye display 206, which directs the light towards the right eye of a user to provide an image on or in the right optical element 110 that overlays the view of the real-world scene seen by the user. Similarly, light 214 emitted by the projector 212 encounters the diffractive structures of the waveguide of the near eye display 216, which directs the light towards the left eye of a user to provide an image on or in the left optical element 108 that overlays the view of the real-world scene seen by the user. The combination of a GPU, the forward optical assembly 202, the left optical element 108, and the right optical element 110 provide an optical engine of the glasses 100. The glasses 100 use the optical engine to generate an overlay of the real-world scene view of the user including display of a user interface to the user of the glasses 100.

It will be appreciated however that other display technologies or configurations may be utilized within an optical engine to display an image to a user in the user's field of view. For example, instead of a projector 204 and a waveguide, an LCD, LED or other display panel or surface may be provided.

In use, a user of the glasses 100 will be presented with information, content and various user interfaces on the near eye displays. As described in more detail herein, the user can then interact with the glasses 100 using a touchpad 126 and/or the buttons 128, voice inputs or touch inputs on an associated device (e.g., client device 826 illustrated in FIG. 8), and/or hand movements, locations, and positions detected by the glasses 100.

Figure 3:
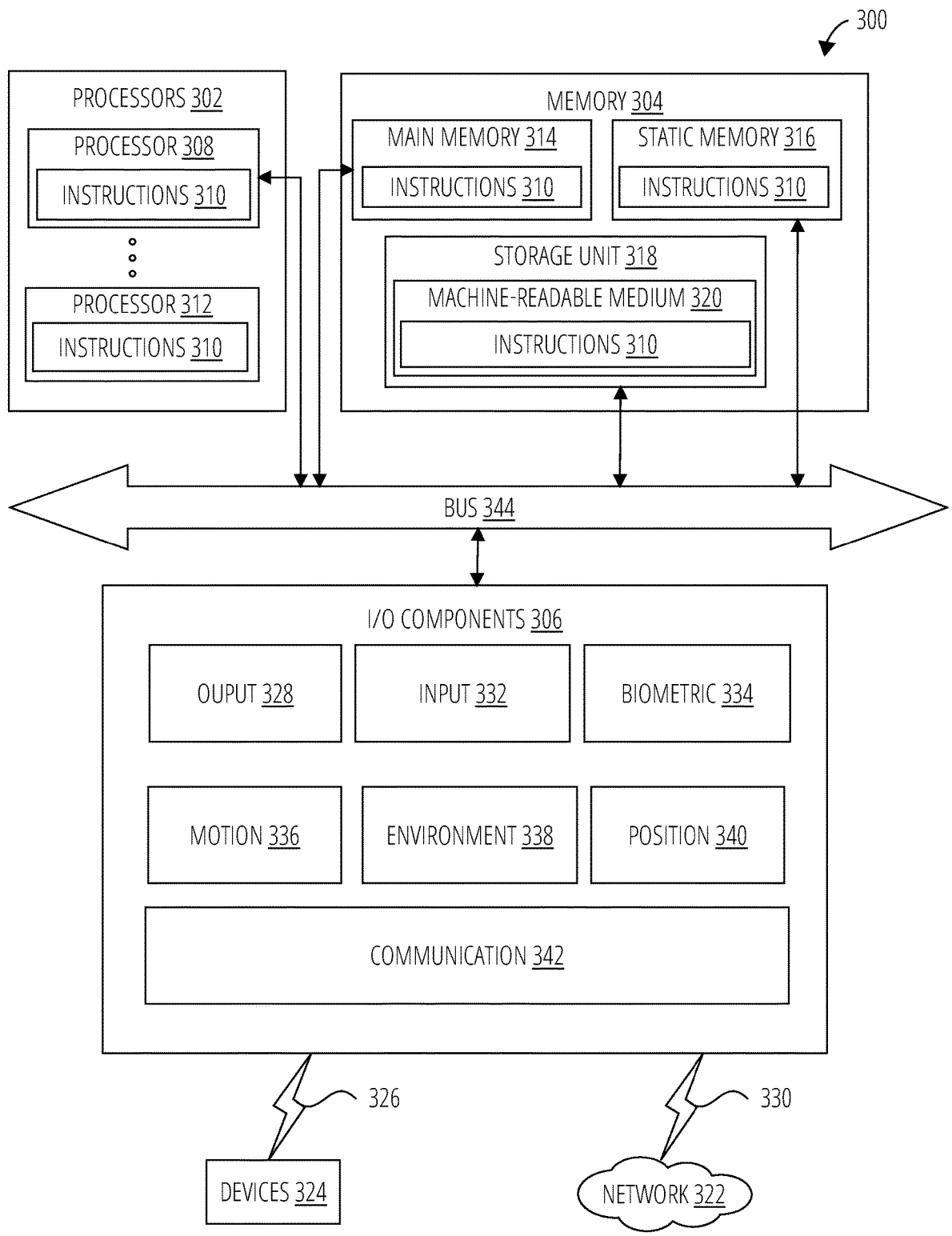
FIG. 3 is a diagrammatic representation of a machine, in the form of a computing apparatus within which a set of instructions may be executed for causing the machine to perform any one or more of the methodologies discussed herein in accordance with some examples.

FIG. 3 is a diagrammatic representation of a machine 300 (such as a computing apparatus) within which instructions 310 (e.g., software, a program, an application, an applet, an app, or other executable code) for causing the machine 300 to perform any one or more of the methodologies discussed herein may be executed. The machine 300 may be utilized as a computer 120 of glasses 100 of FIG. 1. For example, the instructions 310 may cause the machine 300 to execute any one or more of the methods described herein. The instructions 310 transform the general, non-programmed machine 300 into a particular machine 300 programmed to carry out the described and illustrated functions in the manner described. The machine 300 may operate as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a head-worn device (e.g., a smart watch), a smart home device (e.g., a smart appliance), other smart devices, a web appliance, a network router, a network switch, a network bridge, or any machine capable of executing the instructions 310, sequentially or otherwise, that specify actions to be taken by the machine 300. Further, while a single machine 300 is illustrated, the term "machine" may also be taken to include a collection of machines that individually or jointly execute the instructions 310 to perform any one or more of the methodologies discussed herein.

The machine 300 may include processors 302, memory 304, and I/O components 306, which may be configured to communicate with one another via a bus 344. In some examples, the processors 302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 308 and a processor 312 that execute the instructions 310. The term "processor" is intended to include multi-core processors that may comprise two or more independent processors (sometimes referred to as "cores") that may execute instructions contemporaneously. Although FIG. 3 shows multiple processors 302, the machine 300 may include a single processor with a single core, a single processor with multiple cores (e.g., a multi-core processor), multiple processors with a single core, multiple processors with multiples cores, or any combination thereof.

The memory 304 includes a main memory 314, a static memory 316, and a storage unit 318, both accessible to the processors 302 via the bus 344. The main memory 304, the static memory 316, and storage unit 318 store the instructions 310 embodying any one or more of the methodologies or functions described herein. The instructions 310 may also reside, completely or partially, within the main memory 314, within the static memory 316, within machine-readable medium 320 within the storage unit 318, within one or more of the processors 302 (e.g., within the processor's cache memory), or any suitable combination thereof, during execution thereof by the machine 300.

The I/O components 306 may include a wide variety of components to receive input, provide output, produce output, transmit information, exchange information, capture measurements, and so on. The specific I/O components 306 that are included in a particular machine will depend on the type of machine. For example, portable machines such as mobile phones may include a touch input device or other such input mechanisms, while a headless server machine will likely not include such a touch input device. It will be appreciated that the I/O components 306 may include many other components that are not shown in FIG. 3. In various examples, the I/O components 306 may include output components 328 and input components 332. The output components 328 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 332 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 306 may include biometric components 334, motion components 336, environmental components 338, or position components 340, among a wide array of other components. For example, the biometric components 334 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 336 may include inertial measurement units (IMUs), acceleration sensor components (e.g., accelerometer), gravitation sensor components, rotation sensor components (e.g., gyroscope), and so forth. The environmental components 338 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals associated to a surrounding physical environment. The position components 340 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 306 further include communication components 342 operable to couple the machine 300 to a network 322 or devices 324 via a coupling 330 and a coupling 326, respectively. For example, the communication components 342 may include a network interface component or another suitable device to interface with the network 322. In further examples, the communication components 342 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 324 may be another machine or any of a wide variety of peripheral devices (e.g., a peripheral device coupled via a USB).

Moreover, the communication components 342 may detect identifiers or include components operable to detect identifiers. For example, the communication components 342 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 342, such as location via Internet Protocol (IP) geolocation, location via Wi-Fi® signal triangulation, location via detecting an NFC beacon signal that may indicate a particular location, and so forth.

The various memories (e.g., memory 304, main memory 314, static memory 316, and/or memory of the processors 302) and/or storage unit 318 may store one or more sets of instructions and data structures (e.g., software) embodying or used by any one or more of the methodologies or functions described herein. These instructions (e.g., the instructions 310), when executed by processors 302, cause various operations to implement the disclosed examples.

The instructions 310 may be transmitted or received over the network 322, using a transmission medium, via a network interface device (e.g., a network interface component included in the communication components 342) and using any one of a number of well-known transfer protocols (e.g., hypertext transfer protocol (HTTP)). Similarly, the instructions 310 may be transmitted or received using a transmission medium via the coupling 326 (e.g., a peer-to-peer coupling) to the devices 324.

Figure 4A:
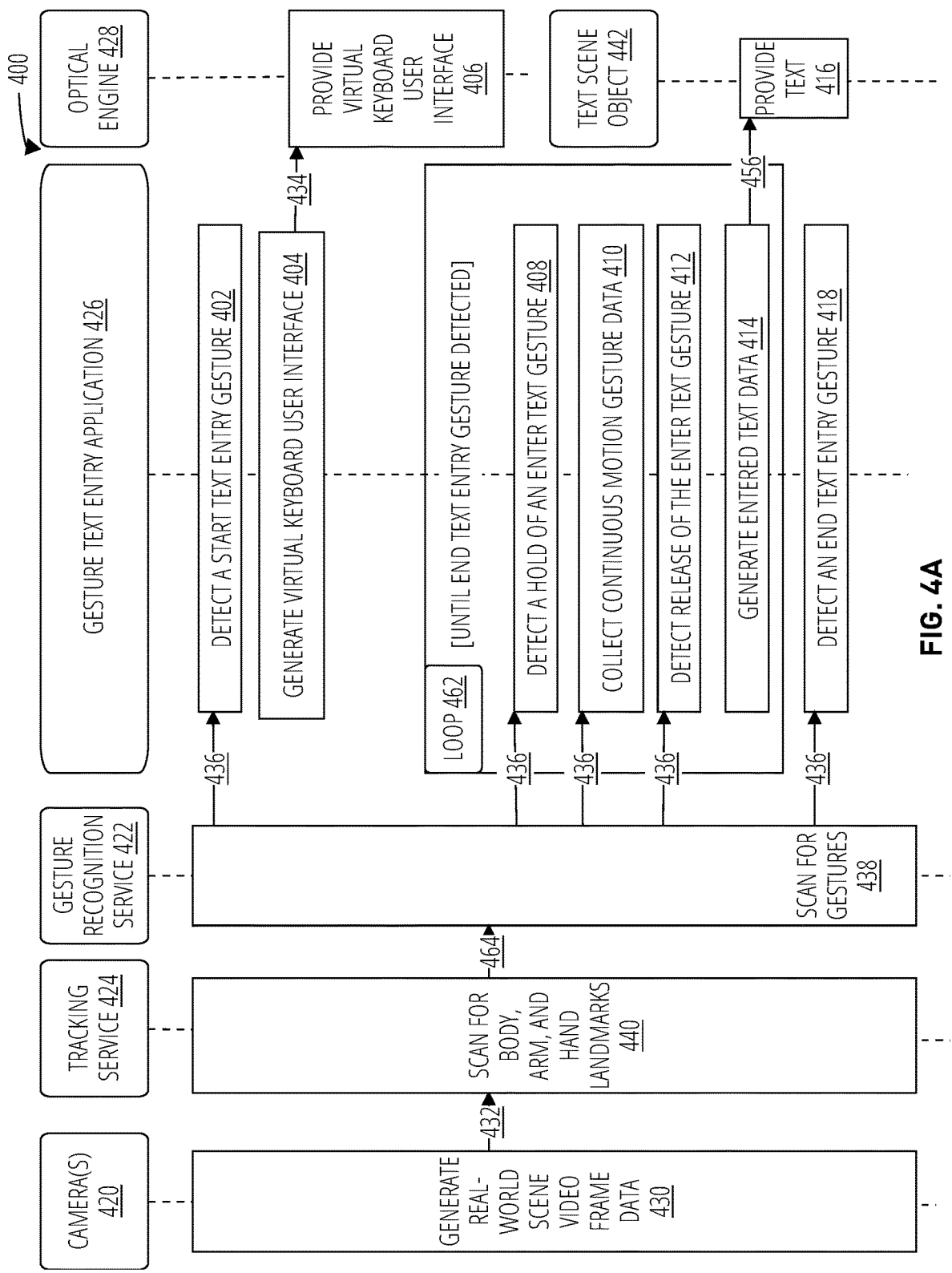
FIG. 4A is a sequence diagram of a gesture-based keyboard process of an AR system in accordance with some examples.
Figure 4B:
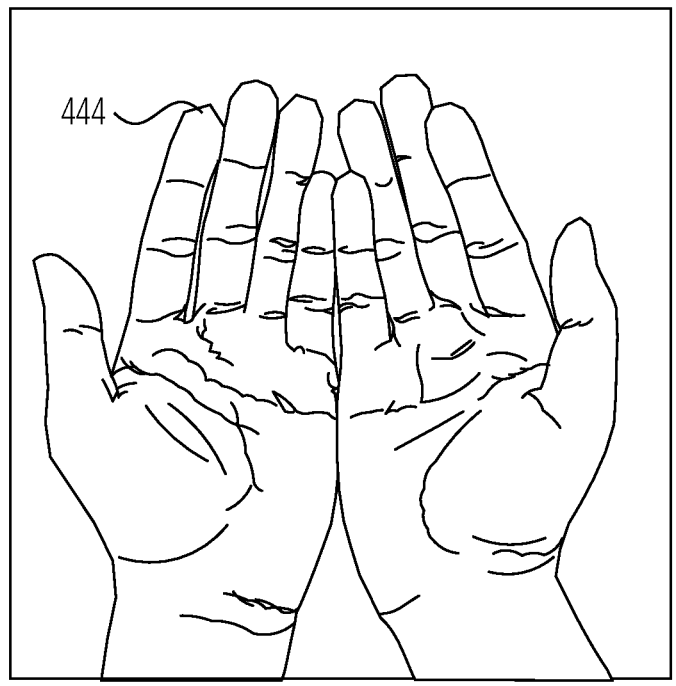
FIG. 4B illustrates a gesture used to instruct an AR system in accordance with some examples.
Figure 4C:
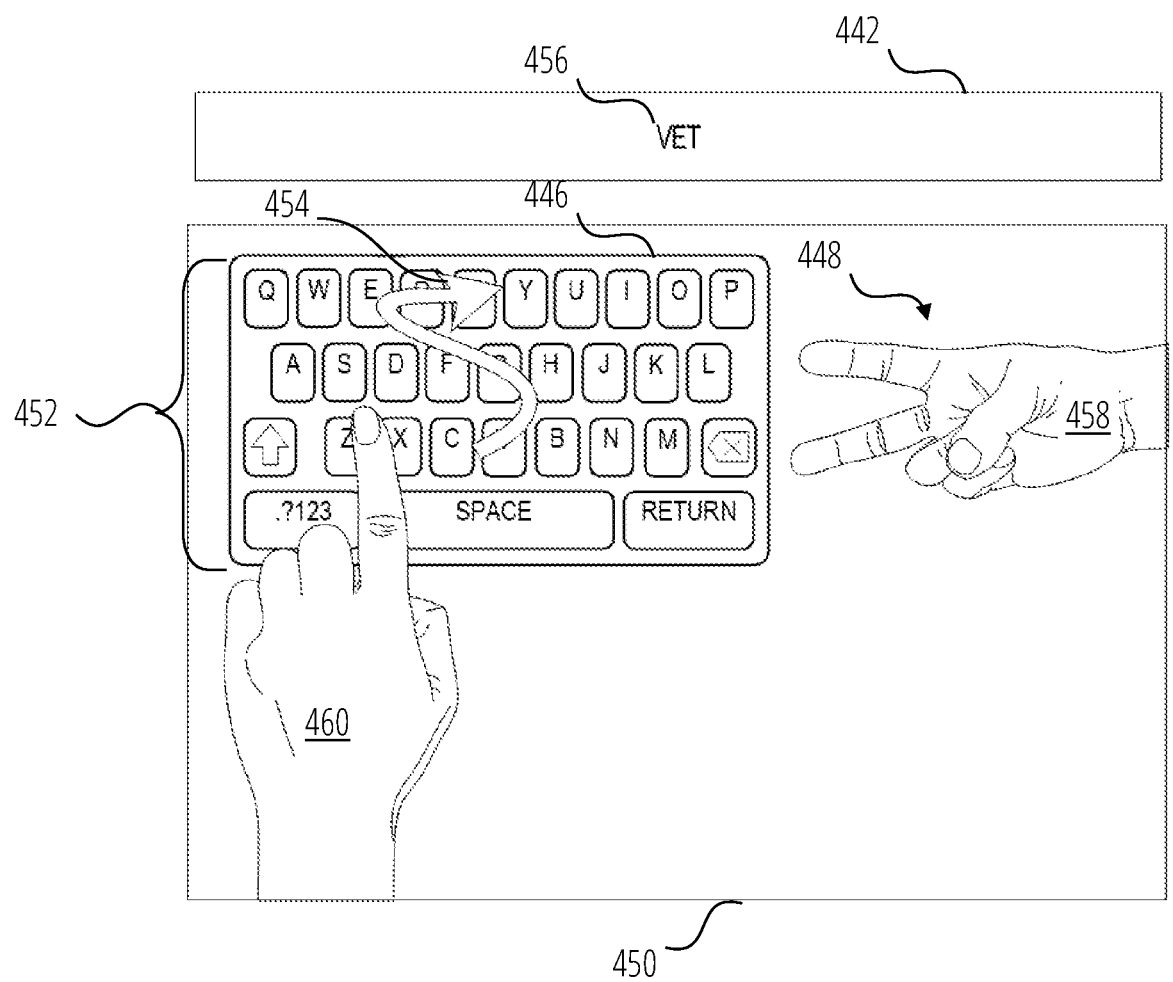
FIG. 4C illustrates a virtual keyboard user interface of an AR system in accordance with some examples.

FIG. 4A is a sequence diagram of a gesture-based keyboard process 400 of an AR system, such as glasses 100, FIG. 4B is an illustration of a start/stop text entry gesture 444, and FIG. 4C is an illustration of a virtual keyboard user interface 450 in accordance with some examples. During the gesture-based keyboard process 400, the AR system utilizes a gesture text entry application 426 to implement the virtual keyboard user interface 450 using gesture recognition methodologies and DMVO methodologies.

During the gesture-based keyboard process 400, in operation 430, one or more cameras 420 of the AR system generate real-world scene video frame data 432 of a real-world scene from a perspective of a user of the AR system. The one or more cameras 420 communicate the real-world scene video frame data 432 to a tracking service 424. Included in the real-world scene video frame data 432 are tracking video frame data of detectable portions of the user's body including portions of the user's upper body, arms, hands, and fingers. The tracking video frame data includes video frame data of movement of portions of the user's upper body, arms, and hands as the user makes a gesture or moves their hands and fingers to interact with the virtual keyboard user interface 450; video frame data of locations of the user's arms and hands in space as the user makes the gesture or moves their hands and fingers to interact with the virtual keyboard user interface 450; and video frame data of positions in which the user holds their upper body, arms, hands, and fingers as the user makes the gesture or moves their hands and fingers to interact with the virtual keyboard user interface 450.

In operation 440, the tracking service 424 scans for, detects, and tracks landmarks on portions of the user's upper body, arms, and hands in the real-world scene. In some examples, the tracking service 424 receives real-world scene video frame data 432 from the one or more cameras 420 and extracts features of the user's upper body, arms, and hands from the tracking video frame data included in the real-world scene video frame data 432. The tracking service 424 generates current tracking data 464 based on the extracted features. The current tracking data 464 includes landmark data including landmark identification, location in the real-world scene, and categorization information of one or more landmarks associated with the user's upper body, arms, and hands. The tracking service 424 communicates the current tracking data 464 to the gesture recognition service 422. In addition, the tracking service 424 makes the current tracking data 464 available to an application being executed on the AR system, such as the gesture text entry application 426.

In operation 438, the gesture recognition service 422 receives the current tracking data 464 from the tracking service 424 and generates current detected gesture data 436 based on the current tracking data 464. In some examples, the gesture recognition service 422 generates one or more current skeletal models of the user's upper body, arms, hands, and fingers based on landmark data of landmarks included in the current tracking data 464. The gesture recognition service 422 compares the one or more current skeletal models to previously generated gesture skeletal models. The gesture recognition service 422 determines a detected gesture on a basis of the comparison of the one or more current skeletal models with the gesture skeletal models and generates the current detected gesture data 436 based on the detected gesture. In additional examples, the gesture recognition service 422 generates the one or more current skeletal models based on the landmark data. The gesture recognition service 422 determines the detected gesture on a basis of categorizing the current skeletal models using artificial intelligence methodologies and a gesture model previously generated using machine learning methodologies. The gesture recognition service 422 generates the current detected gesture data 436 based on the detected gesture.

In some examples, the one or more cameras 420, tracking service 424, and gesture recognition service 422 operate continuously so that the current detected gesture data 436 and current detected gesture data 436 are available on demand for an application executing on the AR system.

In operation 402, the gesture text entry application 426 detects a start text entry gesture, such as start/stop text entry gesture 444, based on the current detected gesture data 436 received from the gesture recognition service 422. The start text entry gesture is an instruction by the user to start text entry into a text scene object 442 of an AR experience being provided by the AR system to the user.

In operation 404, in response to detecting the start text entry gesture, the gesture text entry application 426 generates the virtual keyboard user interface 450 including a virtual keyboard 446. The virtual keyboard 446 includes a plurality of virtual objects that constitute interactive virtual keys 452 of the virtual keyboard 446. The virtual keys 452 are geometric virtual objects having respective locations in a user interface geometric model or volume that corresponds to a volume of space in the real-world scene that is occupied by the virtual keyboard user interface 450. As an example, a width (X) and height (Y) of a user interface geometric model is defined by a field of view from the perspective of the user of the AR system and the depth (Z) is defined by a physical length of 100 cm having an origin at an eye position of the user. The virtual keyboard 446 is assigned a depth location in the user interface geometric model of 50 cm for the eye position of the user that makes it possible for the user to reach the virtual keyboard 446 with their hands while partially extending their arms.

The gesture text entry application 426 generates rendering data 434 of the virtual keyboard user interface 450 and communicates the rendering data 434 to an optical engine 428 of the AR system. In operation 406, the optical engine 428 provides the virtual keyboard user interface 450 to the user in a display of the AR system based on the rendering data 434.

In operation 408, the gesture text entry application 426 detects a hold of an enter text gesture, such as enter text gesture 448, by the user using their free hand 458 based on the current detected gesture data 436 received from the gesture recognition service 422. For example, the gesture text entry application 426 determines that a current detected gesture identified in the current detected gesture data 436 is the same as the enter text gesture 448.

While the user holds the enter text gesture 448, the user moves their text entry hand 460 in a continuous motion 454 to pass through the virtual keys to enter intended text, such as a word. In making the continuous motion 454, the user will pass through the virtual keys representing characters included in the intended text as well as additional virtual keys representing characters that are not included in the intended text. As the one or more cameras 420, the tracking service 424, and the gesture recognition service 422 operate continuously, the current detected gesture data 436 includes continuous motion gesture data of the continuous motion 454 generated while the user holds the enter text gesture 448. In operation 410, the gesture text entry application 426 receives the current detected gesture data 436 and collects the continuous motion gesture data included in the current detected gesture data 436.

In operation 412, the gesture text entry application 426 detects a release of the enter text gesture 448 by the user based on the current detected gesture data 436 received from the gesture recognition service 422. For example, the gesture text entry application 426 determines that a current detected gesture identified in the current detected gesture data 436 is not the enter text gesture 448 that was being held by the user using their free hand 458, In operation 414, the gesture text entry application 426 generates entered text data 456 based on the collected continuous motion gesture data of the continuous motion 454. In some examples, the gesture text entry application 426 maps the collected continuous motion gesture data to text data using artificial intelligence methodologies and a continuous motion gesture model previously generated using machine learning methodologies. The gesture text entry application 426 generates the current detected gesture data 436 based on the mapped text data.

The gesture text entry application 426 communicates the entered text data 456 to the text scene object 442. In operation 416, the text scene object 442 provides the entered text data 456 to the user in a display of the AR system.

In operation 418, the gesture text entry application 426 detects an end text entry gesture, such as, but not limited to, start/stop text entry gesture 444, based on the current detected gesture data 436 received from the gesture recognition service 422 and the gesture text entry application 426 closes the virtual keyboard user interface 450 and terminates. In some examples, the end text entry gesture may be an arbitrary gesture, such as a swipe up gesture, a swipe down gesture, a swipe left gesture, a swipe right gesture, making a fist, holding up a hand in a "stop gesture", etc.

In some examples, the gesture text entry application 426 executes loop 462 until the gesture text entry application 426 detects that the user makes the end text entry gesture in operation 418. Loop 462 includes operation 408 (detecting the user's making and holding the enter text gesture 448), operation 410 (collecting continuous motion gesture data), operation 412 (detecting release of the enter text gesture by the user), and operation 414 (generating the entered text data 456 and communicating the entered text data 456 to the text scene object 442). In this manner, the user can enter multiple words or texts into the text scene object 442.

In some examples, during operation 410, as the gesture text entry application 426 collects the continuous motion gesture data, the gesture text entry application 426 generates an estimated text in a typeahead search mode based on a partial set of collected continuous motion gesture data. For example, as the user makes the continuous motion with their text entry hand 460 while holding the enter text gesture 448 with their free hand 458, the gesture text entry application 426 determines a partial set of continuous motion gesture data before the user releases the enter text gesture 448 as detected in operation 418. The gesture text entry application 426 maps the partial set of continuous motion gesture data to text data using artificial intelligence methodologies and the continuous motion gesture model previously generated using machine learning methodologies. The gesture text entry application 426 generates the entered text data 456 based on the mapped text data and communicates the entered text data 456 to the text scene object 442. In operation 416, the text scene object 442 provides the entered text data 456 to the user in a display of the AR system. If the user determines that the estimated text is the intended text, the user releases the enter text gesture 448.

In some examples, the virtual keyboard user interface 450 remains at a fixed depth (z-distance) from the perspective of the user using the AR system within a field of view of the user of the AR system.

In some examples, the virtual keyboard 446 includes a virtual key selectable by the user to close the virtual keyboard 446 and terminate the gesture-based keyboard process 400, such as a "cancel" or "exit" virtual key.

In some examples, the gesture text entry application 426 is an application that the AR system uses to provide during an AR experience being provided to a user. The AR system uses the gesture-based keyboard process 400 to provide an input modality for the user to enter the entered text data 456 within a text scene object 442 of the AR experience.

In some examples, the gesture text entry application 426 of the AR system performs the functions of the gesture recognition service 422 and the tracking service 424 by utilizing various APIs and system libraries.

Figure 5A:
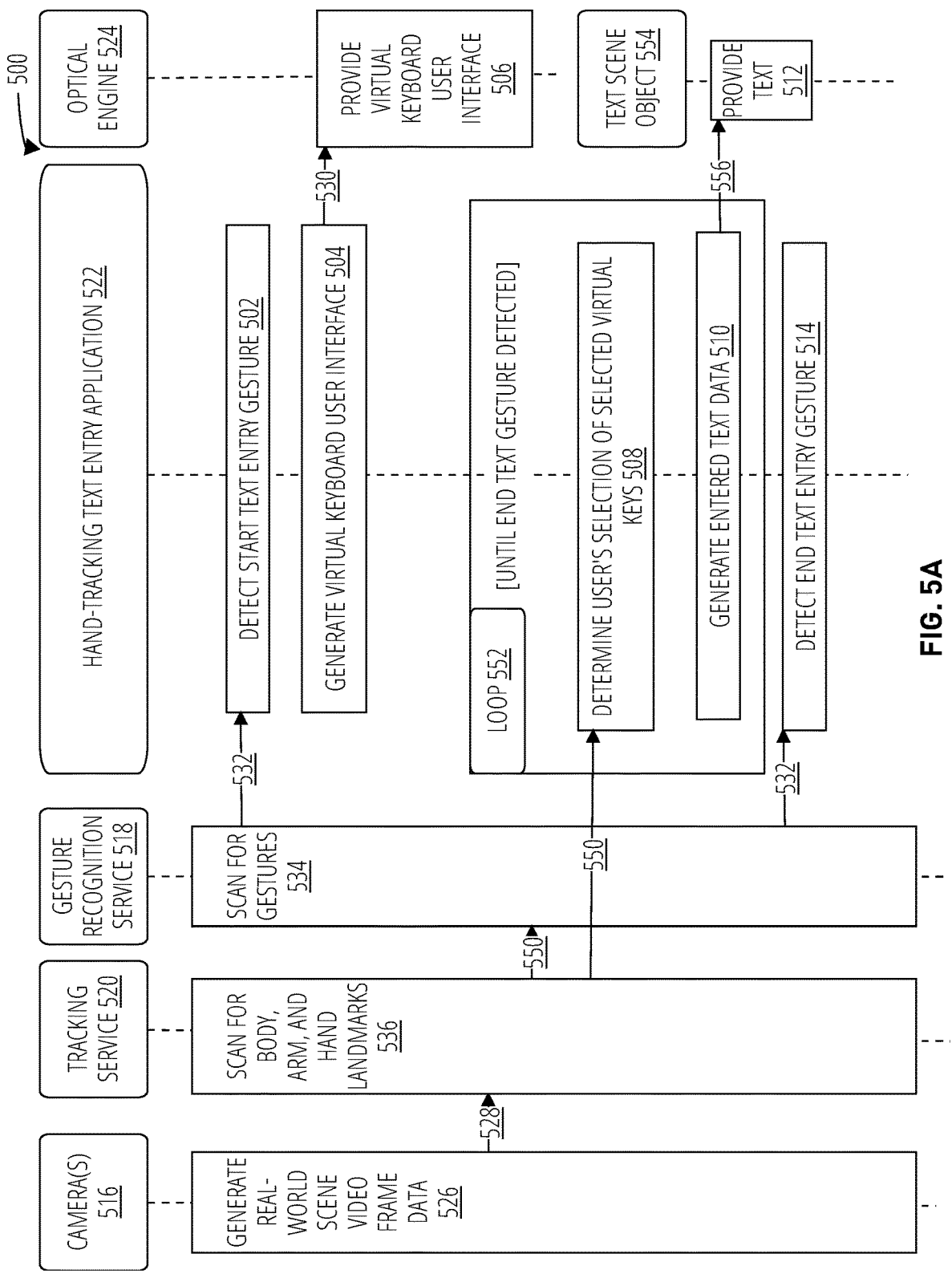
FIG. 5A is a sequence diagram of a hand-tracked keyboard process of an AR system in accordance with some examples.
Figure 5B:
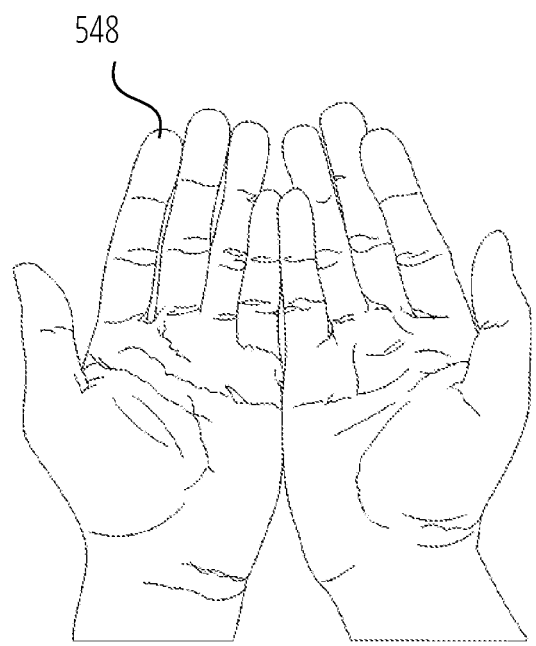
FIG. 5B illustrates another gesture used to instruct an AR system in accordance with some examples.
Figure 5C:
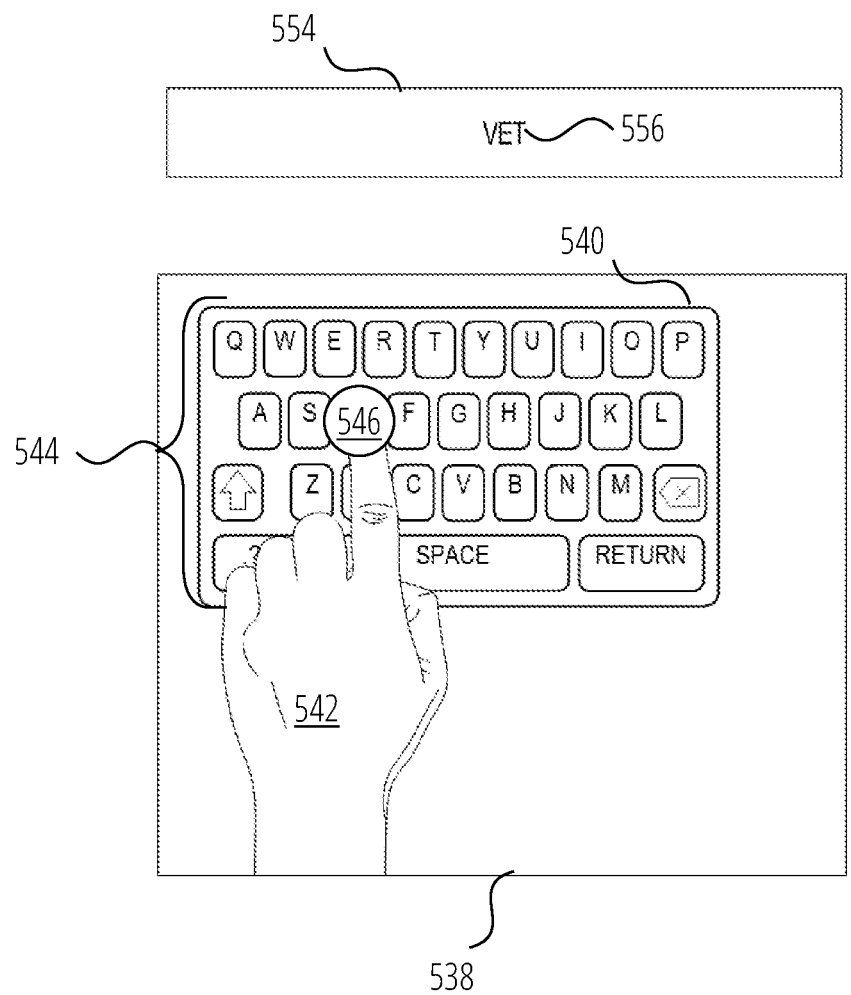
FIG. 5C illustrates another virtual keyboard user interface of an AR system in accordance with some examples.

FIG. 5A is a sequence diagram of a hand-tracked keyboard process 500 of an AR system, such as glasses 100, FIG. 5B is an illustration of a start/end text entry gesture 548, and FIG. 5C is an illustration of a virtual keyboard user interface 538 in accordance with some examples. During the hand-tracked keyboard process 500, the AR system utilizes gesture recognition methodologies and DMVO methodologies to implement a virtual keyboard user interface 538 for a hand-tracking text entry application 522.

During the hand-tracked keyboard process 500, in operation 526, one or more cameras 516 of the AR system generate real-world scene video frame data 528 of a real-world scene from a perspective of a user of the AR system. The one or more cameras 516 communicate the real-world scene video frame data 528 to the tracking service 520. Included in the real-world scene video frame data 528 are tracking video frame data of detectable portions of the user's body including portions of the user's upper body, arms, hands, and fingers. The tracking video frame data includes video frame data of movement of portions of the user's upper body, arms, and hands as the user makes a gesture or moves their hands and fingers to interact with the virtual keyboard user interface 538; video frame data of locations of the user's arms and hands in space as the user makes the gesture or moves their hands and fingers to interact with the virtual keyboard user interface 538; and video frame data of positions in which the user holds their upper body, arms, hands, and fingers as the user makes the gesture or moves their hands and fingers to interact with the virtual keyboard user interface 538.

In operation 536, the tracking service 520 scans for, detects, and tracks landmarks on portions of the user's upper body, arms, and hands in the real-world scene. In some examples, the tracking service 520 receives real-world scene video frame data 528 from the one or more cameras 516 and extracts features of the user's upper body, arms, and hands from the tracking video frame data included in the real-world scene video frame data 528. The tracking service 520 generates current tracking data 550 based on the extracted features. The tracking data includes landmark data including landmark identification, location in the real-world scene, and categorization information identifying one or more landmarks associated with the movement of the user's upper body, arms, and hands. The tracking service 520 communicates the current tracking data 550 to the gesture recognition service 518. In addition, the tracking service 520 makes the current tracking data 550 available to an application being executed on the AR system, such as hand-tracking text entry application 522.

In operation 534, the gesture recognition service 518 receives the current tracking data 550 from the tracking service 520 and generates current detected gesture data 532 based on the current tracking data 550. In some examples, the gesture recognition service 518 generates one or more current skeletal models of the user's upper body, arms, hands, and fingers based on landmark data of landmarks included in the current tracking data 550. The gesture recognition service 518 compares the one or more current skeletal models to previously generated gesture skeletal models. The gesture recognition service 518 determines a detected gesture on a basis of the comparison of the one or more current skeletal models with the gesture skeletal models and generates the current detected gesture data 532 based on the detected gesture. In additional examples, the gesture recognition service 518 generates the one or more current skeletal models based on the landmark data. The gesture recognition service 518 determines the detected gesture on a basis of categorizing the current skeletal models using artificial intelligence methodologies and a gesture model previously generated using machine learning methodologies. The gesture recognition service 518 generates the current detected gesture data 532 based on the detected gesture.

In some examples, the one or more cameras 516, tracking service 520, and gesture recognition service 518, operate continuously so that the current detected gesture data 532 and current tracking data 550 are available on demand for any application being executed by the AR system.

During execution of the hand-tracking text entry application 522 by the AR system, in operation 502, the hand-tracking text entry application 522 detects a start text entry gesture, such as start/end text entry gesture 548, based on current detected gesture data 532 received from the gesture recognition service 518. The start text entry gesture is an instruction by the user to start text entry into a text scene object 554 of an AR experience being provided by the AR system to the user.

In response to detecting the enter text gesture, in operation 504, the hand-tracking text entry application 522 generates a virtual keyboard user interface 538 including a virtual keyboard 540. The virtual keyboard 540 includes a plurality of virtual objects that constitute interactive virtual keys 544 of the virtual keyboard 540. The virtual keys 544 are geometric virtual objects having respective locations in a user interface geometric model or volume that corresponds to a volume of space in the real-world scene that is occupied by the virtual keyboard user interface 538. As an example, a width (X) and height (Y) of a user interface geometric model is defined by a field of view from the perspective of the user of the AR system and the depth (Z) is defined by a physical length of 100 cm having an origin at an eye position of the user. The virtual keyboard 540 is assigned a depth location in the user interface geometric model of 50 cm for the eye position of the user that makes it possible for the user to reach the virtual keyboard 540 with their hands while partially extending their arms.

In operation 504, the hand-tracking text entry application 522 generates rendering data 530 of the virtual keyboard user interface 538 and communicates the rendering data 530 to an optical engine 524 of the AR system. In operation 506, the optical engine 524 provides the virtual keyboard user interface 538 to the user in a display of the AR system based on the rendering data 530.

In operation 508, the hand-tracking text entry application 522 receives current tracking data 550 from the tracking service 520. The hand-tracking text entry application 522 detects a landmark associated with the user's text entry hand 542, for example a tip of the forefinger of the user's text entry hand 542, based on the current tracking data 550. The hand-tracking text entry application 522 generates a landmark collider 546 in the virtual keyboard user interface 538 based on the landmark. To select a virtual key from the virtual keys 544, the user moves their text entry hand 542 to move the landmark collider 546 within the virtual keyboard user interface 538. To move the landmark collider 546 over the virtual keys 544 without selecting a virtual key, the user retracts their text entry hand 542 away from the location of the virtual keyboard 540 in the user interface geometric model thus clearing the virtual keys 544. To select a virtual key, the user positions their text entry hand 542 over the virtual key and extends their text entry hand 542 to "press" or "poke" the virtual key until the landmark collider 546 collides with the selected virtual key. The hand-tracking text entry application 522 determines the user's selection of one or more selected virtual keys by detecting collisions between the landmark collider 546 and the one or more selected virtual keys.

In operation 510, The hand-tracking text entry application 522 generates entered text data 556 based on the selected virtual key. In some examples, each virtual key of the virtual keys 544 is associated with a character. The hand-tracking text entry application 522 converts the associated characters into the entered text data 556.

The hand-tracking text entry application 522 communicates the entered text data 556 to the text scene text scene object 554. In operation 512, the text scene object 554 provides the entered text data 556 to the user in a display of the AR system.

In operation 514, the hand-tracking text entry application 522 detects an end text entry gesture, such as, but not limited to, start/end text entry gesture 548, based on the current detected gesture data 532 received from the gesture recognition service 518. In response to detecting the end text entry gesture, the hand-tracking text entry application 522 closes the virtual keyboard user interface 538 and terminates. In some examples, the end text entry gesture may be an arbitrary gesture, such as a swipe up gesture, a swipe down gesture, a swipe left gesture, a swipe right gesture, making a fist, holding up a hand in a "stop gesture", etc.

In some examples, the hand-tracking text entry application 522 executes loop 552 until an end text entry gesture, such as start/end text entry gesture 548, is detected in operation 514. Loop 552 includes operation 508 (determining selected virtual keys) and operation 510 (generating the entered text data 556 and communicating the 556 to the text scene object 554). In this manner, the hand-tracking text entry application 522 allows a user to enter multiple characters into the text scene object 554.

In some examples, the virtual keyboard 540 includes a virtual key selectable by the user to close the virtual keyboard 540 and terminate the hand-tracked keyboard process 500, such as a "cancel" or "exit" virtual key.

In some examples, the one or more cameras 516, tracking service 520, and gesture recognition service 518, are executed continuously by the AR system so that the currently detected gesture data 532 and current tracking data 550 are available on demand for any application being executed by the AR system.

In some examples, the virtual keyboard user interface 538 remains at a fixed depth (z-distance) from the perspective of the user using the AR system within a field of view of the user of the AR system.

In some examples, the hand-tracking text entry application 522 is an application that the AR system provides to a user during an AR experience provided to the user. The AR system uses the hand-tracked keyboard process 500 to provide an input modality for the user to enter the entered text data 556 within a text scene object 554 of the AR experience.

In some examples, the hand-tracking text entry application 522 of the AR system performs the functions of the gesture recognition service 518 and the tracking service 520 by utilizing various APIs and system libraries.

Figure 6A:
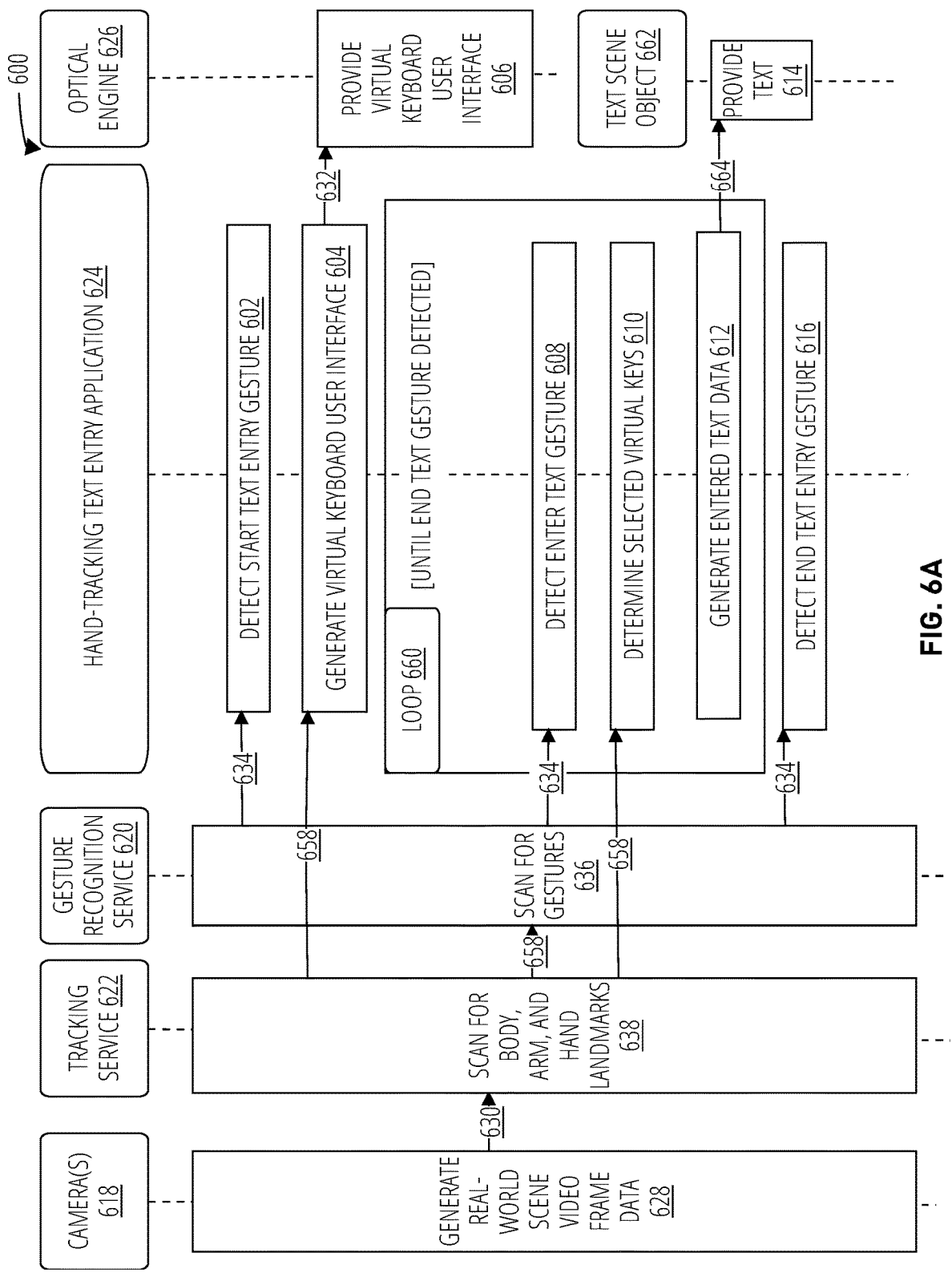
FIG. 6A is a sequence diagram of another hand-tracked keyboard process of an AR system in accordance with some examples.
Figure 6B:
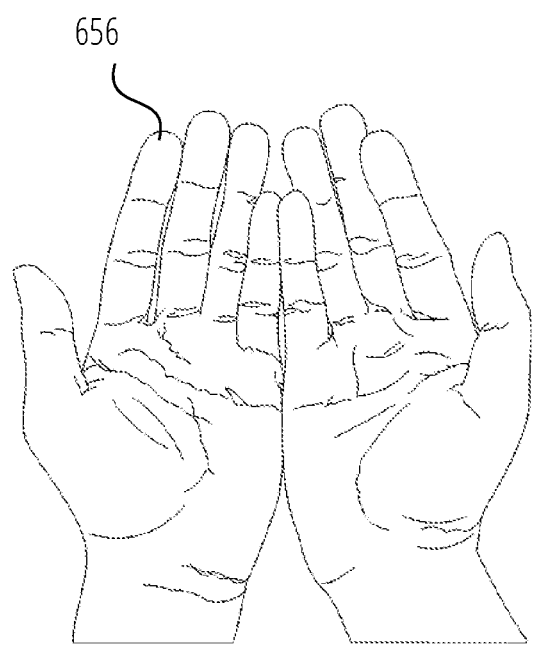
FIG. 6B illustrates another gesture used to instruct an AR system in accordance with some examples.
Figure 6C:
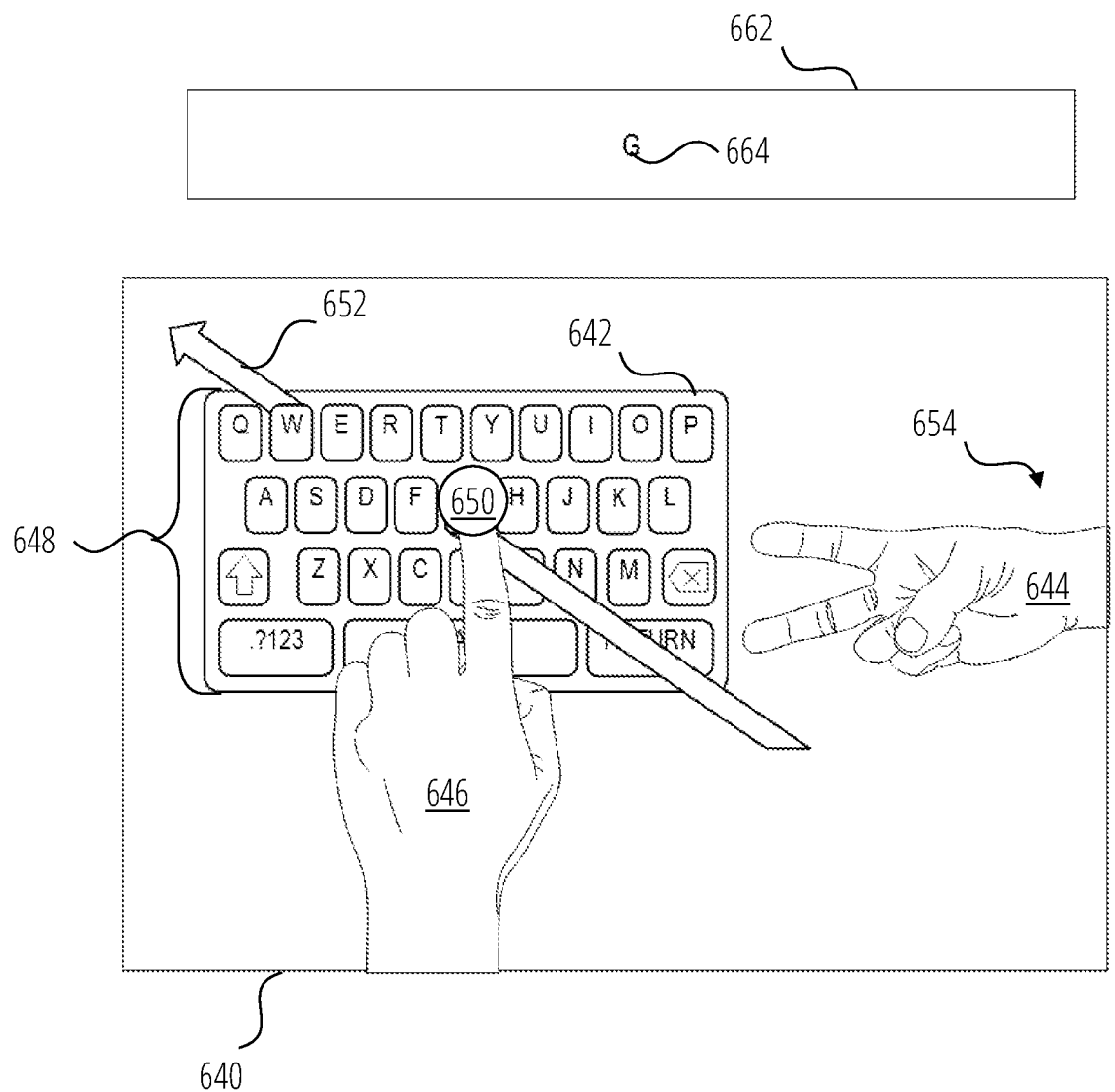
FIG. 6C illustrates another virtual keyboard user interface of an AR system in accordance with some examples.

FIG. 6A is a sequence diagram of a hand-tracked keyboard process 600 of an AR system, such as glasses 100, FIG. 6B is an illustration of a start/end text entry gesture 656, and FIG. 6C is an illustration of a virtual keyboard user interface 640 in accordance with some examples. During the hand-tracked keyboard process 600, the AR system utilizes gesture recognition methodologies and DMVO methodologies to implement a virtual keyboard user interface 640 for a hand-tracking text entry application 624.

During the hand-tracked keyboard process 600, in operation 628, one or more cameras 618 of the AR system generate real-world scene video frame data 630 of a real-world scene from a perspective of a user of the AR system. The one or more cameras 618 communicate the real-world scene video frame data 630 to the tracking service 622. Included in the real-world scene video frame data 630 are tracking video frame data of detectable portions of the user's body including portions of the user's upper body, arms, hands, and fingers. The tracking video frame data includes video frame data of movement of portions of the user's upper body, arms, and hands as the user makes a gesture or moves their hands and fingers to interact with the virtual keyboard user interface 640; video frame data of locations of the user's arms and hands in space as the user makes the gesture or moves their hands and fingers to interact with the virtual keyboard user interface 640; and video frame data of positions in which the user holds their upper body, arms, hands, and fingers as the user makes the gesture or moves their hands and fingers to interact with the virtual keyboard user interface 640.

In operation 638, the tracking service 622 scans for, detects, and tracks landmarks on portions of the user's upper body, arms, and hands in the real-world scene. In some examples, the tracking service 622 receives real-world scene video frame data 630 from the one or more cameras 618 and extracts features of the user's upper body, arms, and hands from the tracking video frame data included in the real-world scene video frame data 630. The tracking service 622 generates current tracking data 658 based on the extracted features. The tracking data includes landmark data including landmark identification, location in the real-world scene, and categorization information identifying one or more landmarks associated with the movement of the user's upper body, arms, and hands. The tracking service 622 communicates the current tracking data 658 to the gesture recognition service 620. In addition, the tracking service 622 makes the current tracking data 658 available to an application being executed on the AR system, such as hand-tracking text entry application 624.

In operation 636, the gesture recognition service 620 receives the current tracking data 658 from the tracking service 622 and generates current detected gesture data 634 based on the current tracking data 658. In some examples, the gesture recognition service 620 generates one or more current skeletal models of the user's upper body, arms, hands, and fingers based on landmark data of landmarks included in the current tracking data 658. The gesture recognition service 620 compares the one or more current skeletal models to previously generated gesture skeletal models. The gesture recognition service 620 determines a detected gesture on a basis of the comparison of the one or more current skeletal models with the gesture skeletal models and generates the current detected gesture data 634 based on the detected gesture. In additional examples, the gesture recognition service 620 generates the one or more current skeletal models based on the landmark data. The gesture recognition service 620 determines the detected gesture on a basis of categorizing the current skeletal models using artificial intelligence methodologies and a gesture model previously generated using machine learning methodologies. The gesture recognition service 620 generates the current detected gesture data 634 based on the detected gesture.

In some examples, the one or more cameras 618, tracking service 622, and gesture recognition service 620, operate continuously so that the current detected gesture data 634 and current tracking data 658 are available on demand for any application being executed by the AR system.

During execution of the hand-tracking text entry application 624 by the AR system, the hand-tracking text entry application 624, in operation 602, detects a start text entry gesture, such as start/end text entry gesture 656, based on the current detected gesture data 634 received from the gesture recognition service 620. The start text entry gesture is an instruction by the user to start text entry into a text scene object 662 of an AR experience being provided by the AR system to the user.

In response to detecting the enter text gesture, in operation 604, the hand-tracking text entry application 624 generates a virtual keyboard user interface 640 including a virtual keyboard 642. The virtual keyboard 642 includes a plurality of virtual objects that constitute interactive virtual keys 648 of the virtual keyboard 642. The virtual keys 648 are geometric virtual objects having respective locations in a user interface geometric model or volume that corresponds to a volume of space in the real-world scene that is occupied by the virtual keyboard user interface 640. As an example, a width (X) and height (Y) of a user interface geometric model is defined by a field of view from the perspective of the user of the AR system and the depth (Z) is defined by a physical length of 100 cm having an origin at an eye position of the user. The virtual keyboard 642 is assigned a depth location in the user interface geometric model of 50 cm for the eye position of the user that makes it possible for the user to reach the virtual keyboard 642 with their hands while partially extending their arms.

In addition to the virtual keyboard 642, the hand-tracking text entry application 624 generates an infinite ray cursor 652 in the virtual keyboard user interface 640 associated with a text entry hand 646 of the user, such as the user's left hand. The hand-tracking text entry application 624 determines a landmark 650 associated with the text entry hand 646, such as the text entry hand's index fingertip, based on the current tracking data 658 received from the tracking service 622. The hand-tracking text entry application 624 sets an origin for the infinite ray cursor 652 at an eye position of the user. During operation, the hand-tracking text entry application 624 projects the infinite ray cursor 652 through the landmark 650 associated with the text entry hand 646 of the user. As the user moves their text entry hand 646, the infinite ray cursor 652 intersects one or more of the virtual keys 648 that are aligned with the eye position of the user and the landmark 650 enabling the user to steer the infinite ray cursor 652 to a virtual key that the user wants to select.

As part of operation 604, the hand-tracking text entry application 624 generates rendering data 632 of the virtual keyboard user interface 640 and communicates the rendering data 632 to an optical engine 626 of the AR system. In operation 606, the optical engine 626 provides the virtual keyboard user interface 640 to the user in a display of the AR system based on the rendering data 632.

The user moves their text entry hand 646 to move the landmark 650 within the virtual keyboard user interface 640 to select a virtual key from the virtual keys 648 by steering the infinite ray cursor 652 to intersect with a virtual key of the virtual keys 648. The user makes a select key gesture, such as gesture 654, with a free hand 644, such as their right hand, to instruct the hand-tracking text entry application 624 to select a virtual key that the infinite ray cursor 652 is currently intersecting. In operation 608, the hand-tracking text entry application 624 detects the select key gesture 654 based on the current detected gesture data 634 received from the gesture recognition service 620.

In operation 610, the hand-tracking text entry application 624 determines a user selection of a selected virtual key. In some examples, the hand-tracking text entry application 624 detects an intersection between the infinite ray cursor 652 and a virtual key of the virtual keys 648. The hand-tracking text entry application 624 determines the intersected virtual key as the selected virtual key.

In operation 612, The hand-tracking text entry application 624 generates entered text data 664 based on the selected virtual key. In some examples, each virtual key of the virtual keys 648 is associated with a character. The hand-tracking text entry application 624 converts the associated characters into the entered text data 664.

The hand-tracking text entry application 624 communicates the entered text data 664 to the text scene text scene object 662. In operation 614, the text scene object 662 provides the entered text data 664 to the user in a display of the AR system.

In operation 616, the hand-tracking text entry application 624 detects an end text entry gesture, such as, but not limited to, start/end text entry gesture 656, based on the current detected gesture data 634 received from the gesture recognition service 620. In response to detecting the end text entry gesture, the hand-tracking text entry application 624 closes the virtual keyboard user interface 640 and terminates. In some examples, the end text entry gesture may be an arbitrary gesture, such as a swipe up gesture, a swipe down gesture, a swipe left gesture, a swipe right gesture, making a fist, holding up a hand in a "stop gesture", etc.

In some examples, the hand-tracking text entry application 624 executes loop 660 until an end text entry gesture, such as start/end text entry gesture 656, is detected. Loop 660 includes operation 608 (detecting the enter text gesture), operation 610 (determining a selected virtual key) and operation 612 (generating the entered text data 664 and communicating the 664 to the text scene object 662). In this manner, the hand-tracking text entry application 624 allows a user to enter multiple characters into the text scene object 662.

In some examples, the infinite ray cursor 652 is not utilized. Instead, in operation 610, the hand-tracking text entry application 624 receives current tracking data 658 from the tracking service 622. The hand-tracking text entry application 624 detects a landmark 650 associated with the user's text entry hand 646, for example a tip of the forefinger of the user's text entry hand 646, based on the current tracking data 658. The hand-tracking text entry application 624 generates a landmark collider in the virtual keyboard user interface 640 based on the landmark 650. To select a virtual key from the virtual keys 648, the user moves their text entry hand 646 to move the landmark collider within the virtual keyboard user interface 640. To move the landmark collider over the virtual keys 648 without selecting a virtual key, the user retracts their text entry hand 646 away from the location of the virtual keyboard 642 in the user interface geometric model thus clearing the virtual keys 648. To select a virtual key, the user positions their text entry hand 646 over the virtual key and extends their text entry hand 646 to "press" or "poke" the virtual key until the landmark collider collides with the selected virtual key. The hand-tracking text entry application 624 determines the user's selection of the selected virtual key by detecting the collision between the landmark collider and the selected virtual key.

In some examples, the virtual keyboard user interface 640 includes a user selectable virtual object that the user selects to terminate the hand-tracked keyboard process 600, such as a "done", "cancel", or "exit" button or virtual key. The user selectable virtual object may be included in the virtual keyboard 642 as a virtual key, or included in the text scene object 662 or included in the AR experience as a user selectable button, etc.

In some examples, the one or more cameras 618, tracking service 622, and gesture recognition service 620, are executed continuously by the AR system so that the currentl detected gesture data 634 and current tracking data 658 are available on demand for any application being executed by the AR system.

In some examples, the virtual keyboard user interface 640 remains at a fixed depth (z-distance) from the perspective of the user using the AR system within a field of view of the user of the AR system.

In some examples, the hand-tracking text entry application 624 is an application that the AR system provides to a user during an AR experience provided to the user. The AR system uses the hand-tracked keyboard process 600 to provide an input modality for the user to enter the entered text data 456 within a text scene object 442 of the AR experience.

In some examples, the hand-tracking text entry application 624 of the AR system performs the functions of the gesture recognition service 620 and the tracking service 622 by utilizing various APIs and system libraries.

Figure 7:
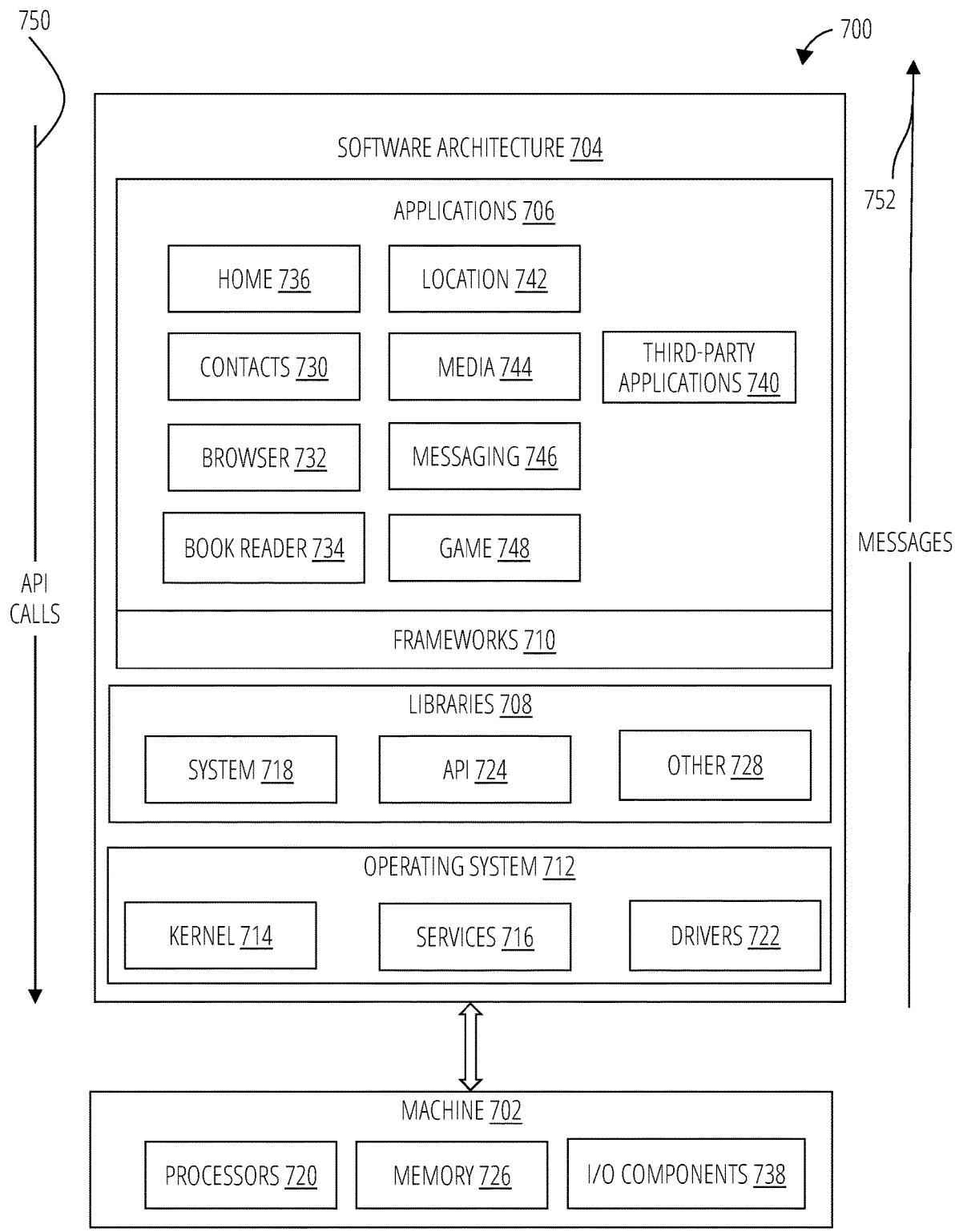
FIG. 7 is a block diagram showing a software architecture within which the present disclosure may be implemented, in accordance with some examples.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where individual layers provides a particular functionality. The software architecture 704 includes layers such as an operating system 712, libraries 708, frameworks 710, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 708 provide a low-level common infrastructure used by the applications 706. The libraries 708 can include system libraries 718 (e.g., C standard library) that provide functions such as memory allocation functions, string manipulation functions, mathematic functions, and the like. In addition, the libraries 708 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) graphic content on a display, GLMotif used to implement user interfaces), image feature extraction libraries (e.g., OpenIMAJ), database libraries (e.g., SQLite to provide various relational database functions), web libraries (e.g., WebKit to provide web browsing functionality), and the like. The libraries 708 can also include a wide variety of other libraries 728 to provide many other APIs to the applications 706.

The frameworks 710 provide a high-level common infrastructure that is used by the applications 706. For example, the frameworks 710 provide various graphical user interface (GUI) functions, high-level resource management, and high-level location services. The frameworks 710 can provide a broad spectrum of other APIs that can be used by the applications 706, some of which may be specific to a particular operating system or platform.

In some examples, the applications 706 may include a home Application 736, a contacts Application 730, a browser Application 732, a book reader Application 734, a location Application 742, a media Application 744, a messaging Application 746, a game Application 748, and a broad assortment of other applications such as third-party applications 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party applications 740 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 740 can invoke the API calls 750 provided by the operating system 712 to facilitate functionality described herein.

Figure 8:
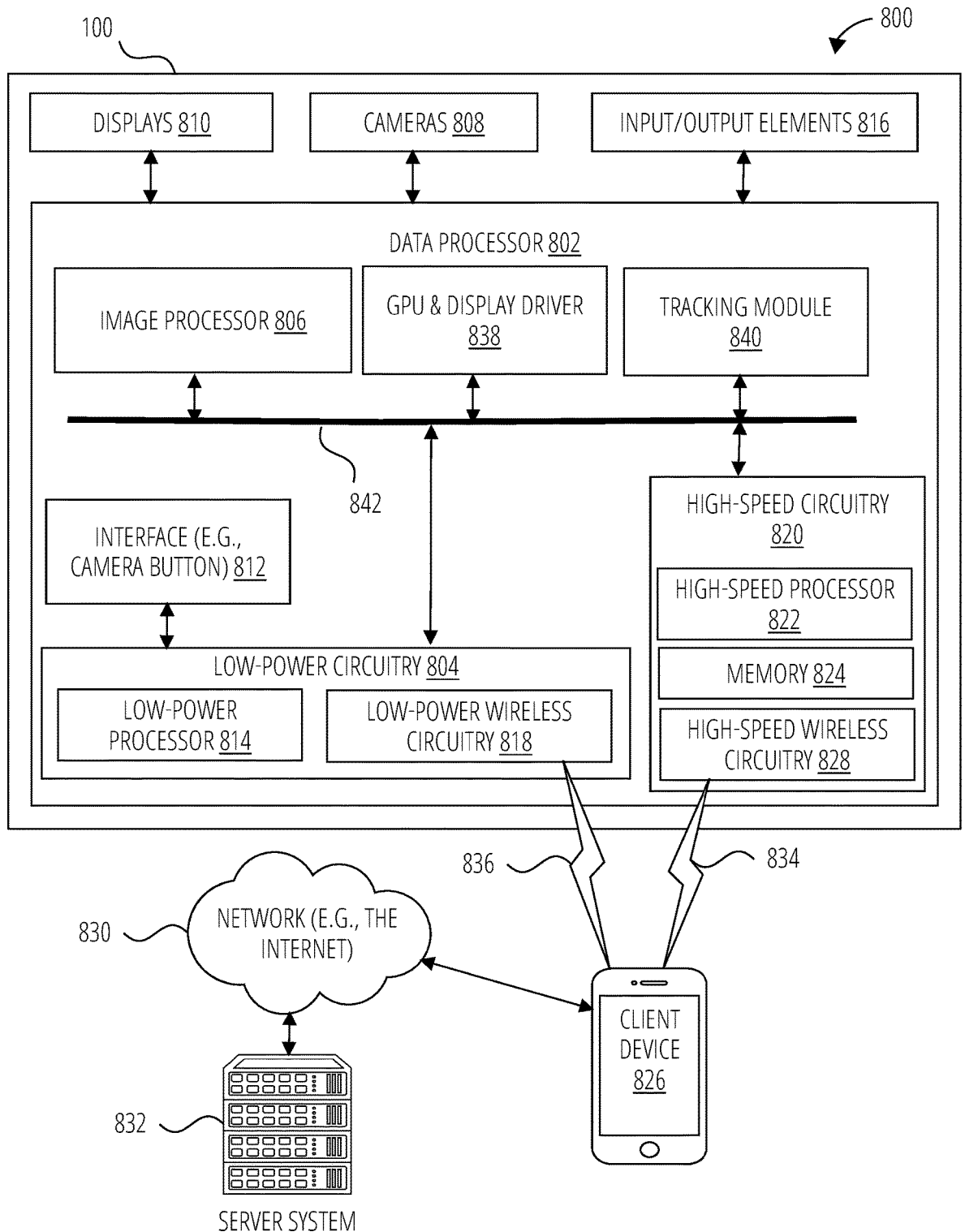
FIG. 8 is a block diagram illustrating a networked system including details of a head-worn AR system, in accordance with some examples.

FIG. 8 is a block diagram illustrating a networked system 800 including details of the glasses 100, in accordance with some examples. The networked system 800 includes the glasses 100, a client device 826, and a server system 832. The client device 826 may be a smartphone, tablet, phablet, laptop computer, access point, or any other such device capable of connecting with the glasses 100 using a low-power wireless connection 836 and/or a high-speed wireless connection 834. The client device 826 is connected to the server system 832 via the network 830. The network 830 may include any combination of wired and wireless connections. The server system 832 may be one or more computing devices as part of a service or network computing system. The client device 826 and any elements of the server system 832 and network 830 may be implemented using details of the software architecture 704 or the machine 300 described in FIG. 7 and FIG. 3 respectively.

The glasses 100 include a data processor 802, displays 810, one or more cameras 808, and additional input/output elements 816. The input/output elements 816 may include microphones, audio speakers, biometric sensors, additional sensors, or additional display elements integrated with the data processor 802. Examples of the input/output elements 816 are discussed further with respect to FIG. 7 and FIG. 3. For example, the input/output elements 816 may include any of I/O components 306 including output components 328, motion components 336, and so forth. Examples of the displays 810 are discussed in FIG. 2. In the particular examples described herein, the displays 810 include a display for the user's left and right eyes.

The data processor 802 includes an image processor 806 (e.g., a video processor), a GPU & display driver 838, a tracking module 840, an interface 812, low-power circuitry 804, and high-speed circuitry 820. The components of the data processor 802 are interconnected by a bus 842.

The interface 812 refers to any source of a user command that is provided to the data processor 802. In one or more examples, the interface 812 is a physical button that, when depressed, sends a user input signal from the interface 812 to a low-power processor 814. A depression of such button followed by an immediate release may be processed by the low-power processor 814 as a request to capture a single image, or vice versa. A depression of such a button for a first period of time may be processed by the low-power processor 814 as a request to capture video data while the button is depressed, and to cease video capture when the button is released, with the video captured while the button was depressed stored as a single video file. Alternatively, depression of a button for an extended period of time may capture a still image. In some examples, the interface 812 may be any mechanical switch or physical interface capable of accepting user inputs associated with a request for data from the cameras 808. In other examples, the interface 812 may have a software component, or may be associated with a command received wirelessly from another source, such as from the client device 826.

The image processor 806 includes circuitry to receive signals from the cameras 808 and process those signals from the cameras 808 into a format suitable for storage in the memory 824 or for transmission to the client device 826. In one or more examples, the image processor 806 (e.g., video processor) comprises a microprocessor integrated circuit (IC) customized for processing sensor data from the cameras 808, along with volatile memory used by the microprocessor in operation.

The low-power circuitry 804 includes the low-power processor 814 and the low-power wireless circuitry 818. These elements of the low-power circuitry 804 may be implemented as separate elements or may be implemented on a single IC as part of a system on a single chip. The low-power processor 814 includes logic for managing the other elements of the glasses 100. As described above, for example, the low-power processor 814 may accept user input signals from the interface 812. The low-power processor 814 may also be configured to receive input signals or instruction communications from the client device 826 via the low-power wireless connection 836. The low-power wireless circuitry 818 includes circuit elements for implementing a low-power wireless communication system. Bluetooth™ Smart, also known as Bluetooth™ low energy, is one standard implementation of a low power wireless communication system that may be used to implement the low-power wireless circuitry 818. In other examples, other low power communication systems may be used.

The high-speed circuitry 820 includes a high-speed processor 822, a memory 824, and a high-speed wireless circuitry 828. The high-speed processor 822 may be any processor capable of managing high-speed communications and operation of any general computing system used for the data processor 802. The high-speed processor 822 includes processing resources used for managing high-speed data transfers on the high-speed wireless connection 834 using the high-speed wireless circuitry 828. In some examples, the high-speed processor 822 executes an operating system such as a LINUX operating system or other such operating system such as the operating system 712 of FIG. 7. In addition to any other responsibilities, the high-speed processor 822 executing a software architecture for the data processor 802 is used to manage data transfers with the high-speed wireless circuitry 828. In some examples, the high-speed wireless circuitry 828 is configured to implement Institute of Electrical and Electronic Engineers (IEEE) 802.11 communication standards, also referred to herein as Wi-Fi. In other examples, other high-speed communications standards may be implemented by the high-speed wireless circuitry 828.

The memory 824 includes any storage device capable of storing camera data generated by the cameras 808 and the image processor 806. While the memory 824 is shown as integrated with the high-speed circuitry 820, in other examples, the memory 824 may be an independent stand-alone element of the data processor 802. In some such examples, electrical routing lines may provide a connection through a chip that includes the high-speed processor 822 from image processor 806 or the low-power processor 814 to the memory 824. In other examples, the high-speed processor 822 may manage addressing of the memory 824 such that the low-power processor 814 will boot the high-speed processor 822 any time that a read or write operation involving the memory 824 is desired.

The tracking module 840 estimates a pose of the glasses 100. For example, the tracking module 840 uses image data and associated inertial data from the cameras 808 and the position components 340, as well as GPS data, to track a location and determine a pose of the glasses 100 relative to a frame of reference (e.g., real-world scene environment). The tracking module 840 continually gathers and uses updated sensor data describing movements of the glasses 100 to determine updated three-dimensional poses of the glasses 100 that indicate changes in the relative position and orientation relative to physical objects in the real-world scene environment. The tracking module 840 permits visual placement of virtual objects relative to physical objects by the glasses 100 within the field of view of the user via the displays 810.

The GPU & display driver 838 may use the pose of the glasses 100 to generate frames of virtual content or other content to be presented on the displays 810 when the glasses 100 are functioning in a traditional augmented reality mode. In this mode, the GPU & display driver 838 generates updated frames of virtual content based on updated three-dimensional poses of the glasses 100, which reflect changes in the position and orientation of the user in relation to physical objects in the user's real-world scene environment.

One or more functions or operations described herein may also be performed in an application resident on the glasses 100 or on the client device 826, or on a remote server. For example, one or more functions or operations described herein may be performed by one of the applications 706 such as messaging Application 746.

Figure 9:
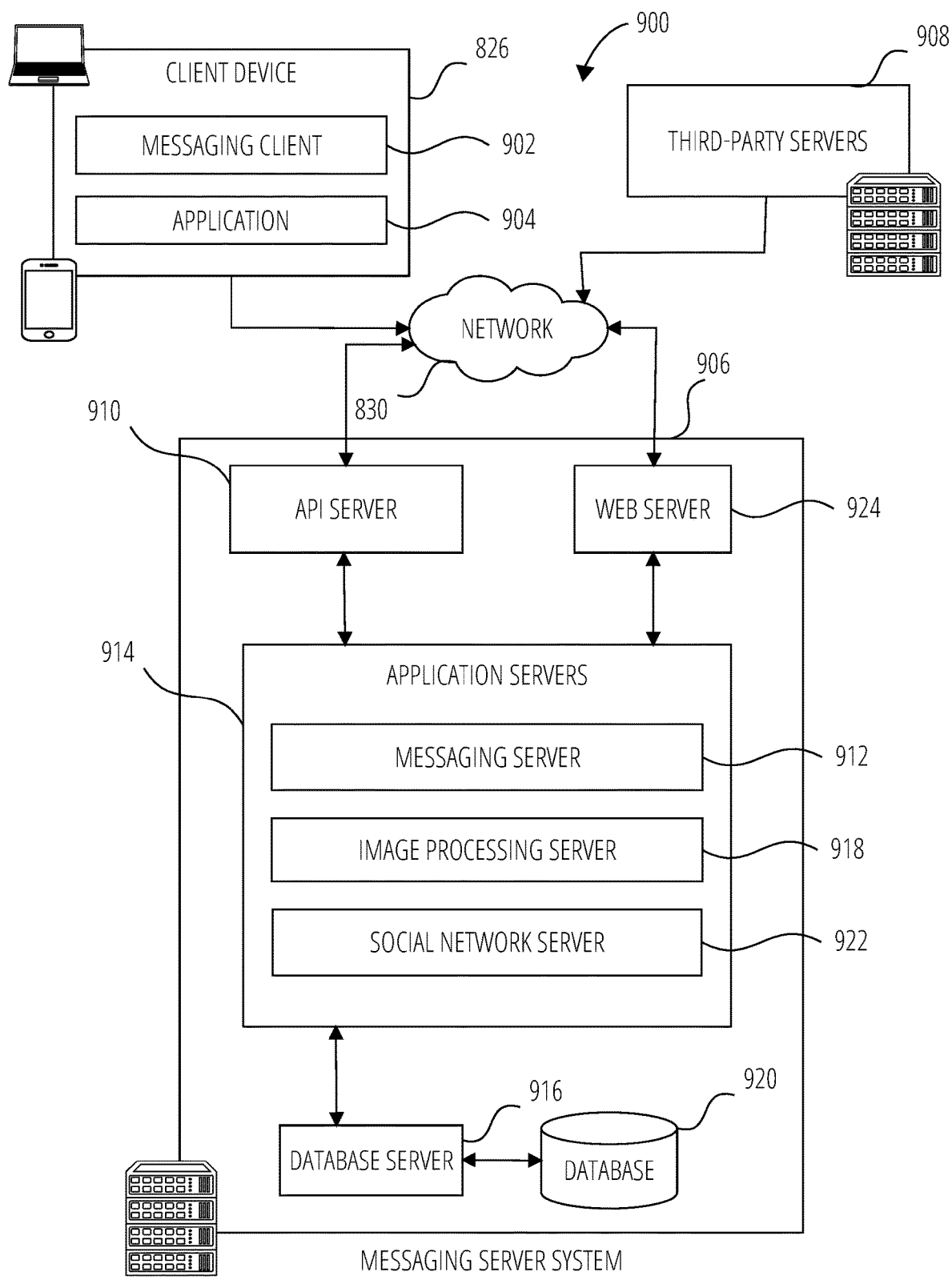
FIG. 9 is a block diagram showing an example messaging system for exchanging data (e.g., messages and associated content) over a network in accordance with some examples

FIG. 9 is a block diagram showing an example messaging system 900 for exchanging data (e.g., messages and associated content) over a network. The messaging system 900 includes multiple instances of a client device 826 which host a number of applications, including a messaging client 902 and other Applications 904. A messaging client 902 is communicatively coupled to other instances of the messaging client 902 (e.g., hosted on respective other client devices 826), a messaging server system 906 and third-party servers 908 via a network 830 (e.g., the Internet). A messaging client 902 can also communicate with locally-hosted Applications 904 using Application Program Interfaces (APIs).

A messaging client 902 is able to communicate and exchange data with other messaging clients 902 and with the messaging server system 906 via the network 830. The data exchanged between messaging clients 902, and between a messaging client 902 and the messaging server system 906, includes functions (e.g., commands to invoke functions) as well as payload data (e.g., text, audio, video or other multimedia data).

The messaging server system 906 provides server-side functionality via the network 830 to a particular messaging client 902. While some functions of the messaging system 900 are described herein as being performed by either a messaging client 902 or by the messaging server system 906, the location of some functionality either within the messaging client 902 or the messaging server system 906 may be a design choice. For example, it may be technically preferable to initially deploy some technology and functionality within the messaging server system 906 but to later migrate this technology and functionality to the messaging client 902 where a client device 826 has sufficient processing capacity.

The messaging server system 906 supports various services and operations that are provided to the messaging client 902. Such operations include transmitting data to, receiving data from, and processing data generated by the messaging client 902. This data may include message content, client device information, geolocation information, media augmentation and overlays, message content persistence conditions, social network information, and live event information, as examples. Data exchanges within the messaging system 900 are invoked and controlled through functions available via user interfaces (UIs) of the messaging client 902.

Turning now specifically to the messaging server system 906, an Application Program Interface (API) server 910 is coupled to, and provides a programmatic interface to, application servers 914. The application servers 914 are communicatively coupled to a database server 916, which facilitates access to a database 920 that stores data associated with messages processed by the application servers 914. Similarly, a web server 924 is coupled to the application servers 914, and provides web-based interfaces to the application servers 914. To this end, the web server 924 processes incoming network requests over the Hypertext Transfer Protocol (HTTP) and several other related protocols.

The Application Program Interface (API) server 910 receives and transmits message data (e.g., commands and message payloads) between the client device 826 and the application servers 914. Specifically, the Application Program Interface (API) server 910 provides a set of interfaces (e.g., routines and protocols) that can be called or queried by the messaging client 902 in order to invoke functionality of the application servers 914. The Application Program Interface (API) server 910 exposes various functions supported by the application servers 914, including account registration, login functionality, the sending of messages, via the application servers 914, from a particular messaging client 902 to another messaging client 902, the sending of media files (e.g., images or video) from a messaging client 902 to a messaging server 912, and for possible access by another messaging client 902, the settings of a collection of media data (e.g., story), the retrieval of a list of friends of a user of a client device 826, the retrieval of such collections, the retrieval of messages and content, the addition and deletion of entities (e.g., friends) to an entity graph (e.g., a social graph), the location of friends within a social graph, and opening an application event (e.g., relating to the messaging client 902).

The application servers 914 host a number of server applications and subsystems, including for example a messaging server 912, an image processing server 918, and a social network server 922. The messaging server 912 implements a number of message processing technologies and functions, particularly related to the aggregation and other processing of content (e.g., textual and multimedia content) included in messages received from multiple instances of the messaging client 902. As will be described in further detail, the text and media content from multiple sources may be aggregated into collections of content (e.g., called stories or galleries). These collections are then made available to the messaging client 902. Other processor and memory intensive processing of data may also be performed server-side by the messaging server 912, in view of the hardware requirements for such processing.

The application servers 914 also include an image processing server 918 that is dedicated to performing various image processing operations, typically with respect to images or video within the payload of a message sent from or received at the messaging server 912.

The social network server 922 supports various social networking functions and services and makes these functions and services available to the messaging server 912. To this end, the social network server 922 maintains and accesses an entity graph within the database 920. Examples of functions and services supported by the social network server 922 include the identification of other users of the messaging system 900 with which a particular user has relationships or is "following," and also the identification of other entities and interests of a particular user.

The messaging client 902 can notify a user of the client device 826, or other users related to such a user (e.g., "friends"), of activity taking place in shared or shareable sessions. For example, the messaging client 902 can provide participants in a conversation (e.g., a chat session) in the messaging client 902 with notifications relating to the current or recent use of a game by one or more members of a group of users. One or more users can be invited to join in an active session or to launch a new session. In some examples, shared sessions can provide a shared augmented reality experience in which multiple people can collaborate or participate.

A "carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing some operations and may be configured or arranged in a particular physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform some operations as described herein. A hardware component may also be implemented mechanically, electronically, or any suitable combination thereof. For example, a hardware component may include dedicated circuitry or logic that is permanently configured to perform some operations. A hardware component may be a special-purpose processor, such as a field-programmable gate array (FPGA) or an application specific integrated circuit (ASIC). A hardware component may also include programmable logic or circuitry that is temporarily configured by software to perform some operations. For example, a hardware component may include software executed by a general-purpose processor or other programmable processor. Once configured by such software, hardware components become specific machines (or specific components of a machine) tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") is to be understood to encompass a tangible entity, be that an entity that is physically constructed, permanently configured (e.g., hardwired), or temporarily configured (e.g., programmed) to operate in a particular manner or to perform some operations described herein. Considering examples in which hardware components are temporarily configured (e.g., programmed), the hardware components may not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be partially processor-implemented, with a particular processor or processors being an example of hardware. For example, some of the operations of a method may be performed by one or more processors or processor-implemented components. Moreover, the one or more processors may also operate to support performance of the relevant operations in a "cloud computing" environment or as a "software as a service" (SaaS). For example, at some of the operations may be performed by a group of computers (as examples of machines including processors), with these operations being accessible via a network (e.g., the Internet) and via one or more appropriate interfaces (e.g., an API). The performance of some of the operations may be distributed among the processors, residing within a single machine as well as being deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

A "machine-storage medium" refers to a single or multiple storage devices and/or media (e.g., a centralized or distributed database, and/or associated caches and servers) that store executable instructions, routines and/or data. The term includes, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at some of which are covered under the term "signal medium."

A "processor" refers to any circuit or virtual circuit (a physical circuit emulated by logic executing on an actual processor) that manipulates data values according to control signals (e.g., "commands", "op codes", "machine code", and so forth) and which produces associated output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" may be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer-implemented method comprising:
   while continuously capturing, by one or more processors of an Augmented Realty (AR) system using one or more cameras of the AR system, video frame data of one or more hands of a user using the AR system, performing operations comprising:
   detecting, by the one or more processors based on the video frame data, a start text entry gesture made by a user of the AR system;
   generating, by the one or more processors, in response to detecting the start text entry gesture, a virtual keyboard user interface including a virtual keyboard having a plurality of virtual keys;
   providing to the user, by the one or more processors, the virtual keyboard user interface using a display of the AR system;
   detecting, by the one or more processors based on the video frame data, an enter text gesture made by the user using a free hand of the one or more hands;
   detecting, by the one or more processors based on the video frame data, a hold of the enter text gesture by the user;
   in response to detecting the hold of the enter text gesture by the user, performing operations comprising:
      determining, by the one or more processors based on the video frame data, a continuous motion gesture by the user passing through one or more virtual keys of the plurality of virtual keys, the continuous motion gesture being made by the user using a text entry hand of the one or more hands separate from the free hand while the free hand holds the enter text gesture;
      detecting, by the one or more processors based on the video frame data, a release of the enter text gesture being held by the free hand; and
      in response to detecting the release of the enter text gesture by the free hand, performing operations comprising:
         generating, by the one or more processors, entered text data using the continuous motion gesture; and
         providing, by the one or more processors, the entered text data to the user using the display of the AR system;
   detecting, by the one or more processors using the video frame data, an end text entry gesture made by the user; and
   in response to detecting the end text entry gesture, closing, by the one or more processors, the virtual keyboard user interface.

2. The computer-implemented method of claim 1, wherein the detecting, by the one or more processors based on the video frame data, the start text entry gesture made by the user of the AR system further comprises:
   generating tracking data based on the video frame data;
   generating one or more skeletal models based on the tracking data; and
   determining the start text entry gesture on a basis of categorizing the one or more skeletal models using artificial intelligence methodologies and a gesture model previously generated using machine learning methodologies.

3. The computer-implemented method of claim 1, wherein the detecting, by the one or more processors based on the video frame data, the start text entry gesture made by the user of the AR system further comprises:
   generating tracking data based on the video frame data;
   generating one or more skeletal models based on the tracking data;
   comparing the one or more skeletal models to previously generated gesture skeletal models; and determining the start text entry gesture based on the comparing of the one or more skeletal models with the gesture skeletal models.

4. The computer-implemented method of claim 1, wherein the AR system comprises a head-worn device.

5. The computer-implemented method of claim 1, further comprising: dynamically adjusting a depth location of the virtual keyboard user interface to maintain a fixed distance from one or more eyes of the user as determined by tracking data generated by the one or more processors based on the video frame data.

6. A computing apparatus of an AR system, comprising:
one or more processors; and
a memory storing instructions that, when executed by the one or more processors, cause the computing apparatus to perform operations comprising:
while continuously capturing, using one or more cameras of an AR system, video frame data of one or more hands of a user using the AR system, performing operations comprising:
detecting, based on the video frame data, a start text entry gesture made by a user of the AR system;
generating, in response to detecting the start text entry gesture, a virtual keyboard user interface including a virtual keyboard having a plurality of virtual keys;
providing to the user, the virtual keyboard user interface using a display of the AR system;
detecting, based on the video frame data, an enter text gesture made by the user using a free hand of the one or more hands;
detecting, based on the video frame data, a hold of the enter text gesture by the user;
in response to detecting the hold of the enter text gesture by the user, performing operations comprising:
determining, based on the video frame data, a continuous motion gesture by the user passing through one or more virtual keys of the plurality of virtual keys, the continuous motion gesture being made by the user using a text entry hand of the one or more hands separate from the free hand while the free hand holds the enter text gesture;
detecting, based on the video frame data, a release of the enter text gesture being held by the free hand; and
in response to detecting the release of the enter text gesture by the free hand, performing operations comprising:
generating entered text data using the continuous motion gesture; and
providing the entered text data to the user using the display of the AR system;
detecting, based on the video frame data, an end text entry gesture made by the user; and
in response to detecting the end text gesture, closing the virtual keyboard user interface.

7. The computing apparatus of the AR system of claim 6, wherein the detecting, based on the video frame data, the start text entry gesture made by the user of the AR system, further comprises:
generating tracking data based on the video frame data;
generating one or more skeletal models based on the tracking data; and
determining the start text entry gesture on a basis of categorizing the one or more skeletal models using artificial intelligence methodologies and a gesture model previously generated using machine learning methodologies.

8. The computing apparatus of the AR system of claim 6, wherein the detecting, based on the video frame data, the start text entry gesture made by the user of the AR system further comprises:
generating tracking data based on the video frame data;
generating one or more skeletal models based on the tracking data;
comparing the one or more skeletal models to previously generated gesture skeletal models; and
determining the start text entry gesture based on the comparing of the one or more skeletal models with the gesture skeletal models.

9. The computing apparatus of the AR system of claim 6, wherein the AR system comprises a head-worn device.

10. The computing apparatus of the AR system of claim 6, wherein the instructions further cause the computing apparatus to perform operations comprising:
dynamically adjusting a depth location of the virtual keyboard user interface to maintain a fixed distance from one or more eyes of the user as determined by tracking data generated by the one or more processors based on the video frame data.

11. A non-transitory computer-readable storage medium, the computer-readable storage medium including instructions that when executed by a computer of an AR system, cause the computer to perform operations comprising:
while continuously capturing, using one or more cameras of an AR system, video frame data of one or more hands of a user using the AR system, performing operations comprising:
detecting, based on the video frame data, a start text entry gesture made by a user of the AR system;
generating, in response to detecting the start text entry gesture, a virtual keyboard user interface including a virtual keyboard having a plurality of virtual keys;
providing to the user, the virtual keyboard user interface using a display of the AR system;
detecting, based on the video frame data, an enter text gesture made by the user using a free hand of the one or more hands;
detecting, based on the video frame data, a hold of the enter text gesture made by the user using the free hand;
in response to detecting the hold of the enter text gesture by the user, performing operations comprising:
determining, based on the video frame data, a continuous motion gesture by the user passing through one or more virtual keys of the plurality of virtual keys, the continuous motion gesture being made by the user using a text entry hand of the one or more hands separate from the free hand while the free hand holds the enter text gesture;
detecting, based on the video frame data, a release of the enter text gesture being held by the free hand; and
in response to detecting the release of the enter text gesture by the free hand, performing operations comprising:
generating entered text data using the continuous motion gesture; and
providing the entered text data to the user using the display of the AR system;

detecting, based on the video frame data, an end text entry gesture made by the user; and in response to detecting the end text gesture, closing the virtual keyboard user interface.

12. The non-transitory computer-readable storage medium of claim 11, wherein the instructions causing the computer to perform the operation of detecting, based on the video frame data, the start text entry gesture made by the user of the AR system, further cause the computer to perform operations of:

generating tracking data based on the video frame data;

generating one or more skeletal models based on the tracking data; and determining the start text entry gesture on a basis of categorizing the one or more skeletal models using artificial intelligence methodologies and a gesture model previously generated using machine learning methodologies.

13. The non-transitory computer-readable storage medium of claim 11, wherein the instructions causing the computer to perform the operation of detecting, based on the video frame data, the start text entry gesture made by the user of the AR system, further cause the computer to perform operations of:

generating tracking data based on the video frame data;

generating one or more skeletal models based on the tracking data;

comparing the one or more skeletal models to previously generated gesture skeletal models; and determining the start text entry gesture based on the comparing of the one or more skeletal models with the gesture skeletal models.

14. The non-transitory computer-readable storage medium of claim 11, wherein the AR system comprises a head-worn device.

* * * * *